US008825065B2

(12) United States Patent
Sutton

(10) Patent No.: US 8,825,065 B2
(45) Date of Patent: Sep. 2, 2014

(54) TRANSMIT POWER DEPENDENT REDUCED EMISSIONS FROM A WIRELESS TRANSCEIVER

(75) Inventor: Todd Sutton, Del Mar, CA (US)

(73) Assignee: Wi-Lan, Inc., Ottawa (CA)

(*) Notice: Subject to any disclaimer, the term of this patent is extended or adjusted under 35 U.S.C. 154(b) by 946 days.

(21) Appl. No.: 11/625,260

(22) Filed: Jan. 19, 2007

(65) Prior Publication Data

US 2008/0176575 A1    Jul. 24, 2008

(51) Int. Cl.
H04W 72/00    (2009.01)

(52) U.S. Cl.
USPC ...... 455/450; 455/522; 455/114.2; 455/114.3

(58) Field of Classification Search
USPC ............. 455/114.2, 114.3, 115.3, 67.13, 522, 455/450; 370/329–333, 431
See application file for complete search history.

(56) References Cited

U.S. PATENT DOCUMENTS

| | | | |
|---|---|---|---|
| 5,166,629 A | 11/1992 | Watkins et al. | |
| 6,236,864 B1 | 5/2001 | McGowan et al. | |
| 6,353,729 B1 | 3/2002 | Bassirat | |
| 6,675,004 B1 | 1/2004 | Waylett | |
| 6,847,678 B2 | 1/2005 | Berezdivin et al. | |
| 6,944,402 B1 | 9/2005 | Baker et al. | |
| 6,947,388 B1 | 9/2005 | Wagner | |
| 7,042,287 B2 | 5/2006 | Robinson | |
| 7,151,795 B1 | 12/2006 | Goldburg | |
| 7,613,242 B2 | 11/2009 | Bykovnikov | |
| 7,620,020 B2 | 11/2009 | Lim et al. | |
| 2001/0000456 A1 | 4/2001 | McGowan | |
| 2001/0031015 A1 | 10/2001 | West et al. | |
| 2003/0096579 A1 | 5/2003 | Ito et al. | |
| 2003/0108112 A1 | 6/2003 | Rudolph et al. | |
| 2004/0162097 A1* | 8/2004 | Vijayan et al. | 455/522 |
| 2004/0208253 A1 | 10/2004 | Joo | |
| 2004/0252776 A1 | 12/2004 | Balakrishnan et al. | |
| 2004/0266369 A1 | 12/2004 | McCallister | |
| 2005/0078743 A1 | 4/2005 | Shohara | |

(Continued)

FOREIGN PATENT DOCUMENTS

| | | |
|---|---|---|
| CN | 1505301 | 6/2004 |
| JP | 2007-013344 | 1/2007 |
| WO | 00/28694 | 5/2000 |

OTHER PUBLICATIONS

Compatibility of Services Using WiMAX Technology with Satellite Services in the 2.3-2.7 GHz and 3.3-3.8 GHz Bands, WiMAX Forum, Copyright 2007 WiMAX Forum White Paper, p. 1-49.

(Continued)

Primary Examiner — Kwasi Karikari
(74) Attorney, Agent, or Firm — Volpe and Koenig, P.C.

(57) ABSTRACT

Methods and apparatus for reducing out of band emissions through selective resource allocation, transmit power control, or a combination thereof. A resource controller, such as a base station, can allocate uplink resources to a requesting subscriber station based in part on an expected transmit power. The base station can allocate uplink bandwidth to the subscriber station based on an expected subscriber station uplink transmit power and a frequency of a restricted emissions band. Those subscriber stations having higher expected transmit powers are allocated bandwidth further from the restricted emissions band. The subscriber station can perform complementary transmit power control based on allocated uplink resources. The subscriber station can limit a transmit power based in part on a bandwidth allocation, modulation type allocation, or some combination thereof.

19 Claims, 14 Drawing Sheets

(56) References Cited

U.S. PATENT DOCUMENTS

| | | |
|---|---|---|
| 2005/0265288 A1 | 12/2005 | Liu et al. |
| 2005/0286408 A1 | 12/2005 | Jin et al. |
| 2005/0287978 A1 | 12/2005 | Maltsev et al. |
| 2006/0013206 A1 | 1/2006 | Nambirajan |
| 2006/0014569 A1 | 1/2006 | Delgiorno |
| 2006/0040619 A1* | 2/2006 | Cho et al. ............ 455/69 |
| 2006/0083211 A1* | 4/2006 | Laroia et al. ............ 370/343 |
| 2006/0084439 A1 | 4/2006 | Joshi et al. |
| 2006/0109939 A1 | 5/2006 | Ciccarelli et al. |
| 2006/0146760 A1 | 7/2006 | Khandekar et al. |
| 2006/0148411 A1* | 7/2006 | Cho et al. ............ 455/67.13 |
| 2006/0154684 A1 | 7/2006 | Meiyappan |
| 2006/0154685 A1 | 7/2006 | Shin et al. |
| 2006/0171295 A1 | 8/2006 | Ihm et al. |
| 2006/0270416 A1 | 11/2006 | Perets et al. |
| 2006/0281419 A1 | 12/2006 | Peplinski et al. |
| 2007/0042778 A1 | 2/2007 | Keller et al. |
| 2007/0115862 A1 | 5/2007 | Lee et al. |
| 2007/0147484 A1 | 6/2007 | Lee |
| 2008/0025254 A1* | 1/2008 | Love et al. ............ 370/329 |
| 2008/0070610 A1* | 3/2008 | Nishio ............ 455/509 |
| 2008/0273610 A1* | 11/2008 | Malladi et al. ............ 375/260 |

OTHER PUBLICATIONS

Cavell, Mertz & Davis, Inc. Consulting Engineers and Sirius Satellite Radio Engineering, Interference to the SDARS Service from WCS Transmitters, Technical White Paper, Mar. 28, 2006, p. 1-44, USA.

Compatibility of Services Using WiMAX Technology with Satellite Services in the 2.3-2.7 GHz and 3.3-3.8 GHz Bands, WiMAX Forum, Copyright 2007 WiMAX Forum White Paper, pp. 1-49.

IEEE Recommended Practice for Local and metropolitan area networks, Coexistence of Fixed Broadband Wireless Access Systems, 802.16.2, IEEE Std. 802.16.2-2004 (Mar. 17, 2004).

Intini, "Orthogonal frequency division multiplexing for wireless networks," IEEE 802.11a, pp. 1-40 (Dec. 2000).

Masse, "A direct-conversion transmitter for WiMAX and WiBro applications," Analog/RF Front End, www.rfdesign.com, pp. 42, 44, and 46 (Jan. 2006).

Third Generation Partnership Project, "Technical Specification Group Radio Access Network; Physical layer aspects for evolved Universal Terrestrial Radio Access (UTRA) (Release 7)," 3GPP TR 25.814 V7.0.0 (Jun. 2006).

* cited by examiner

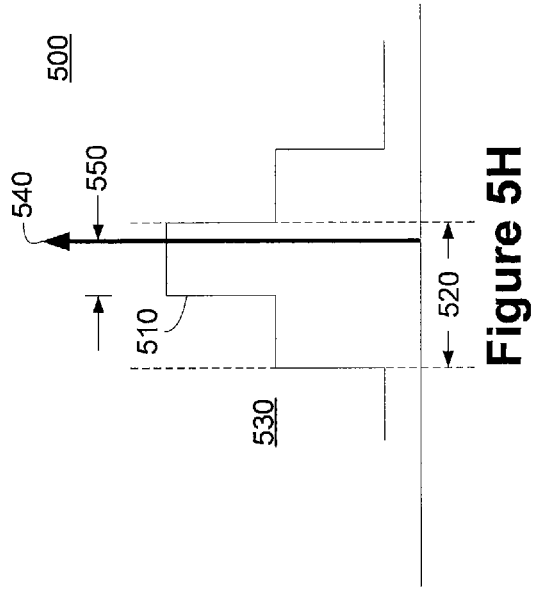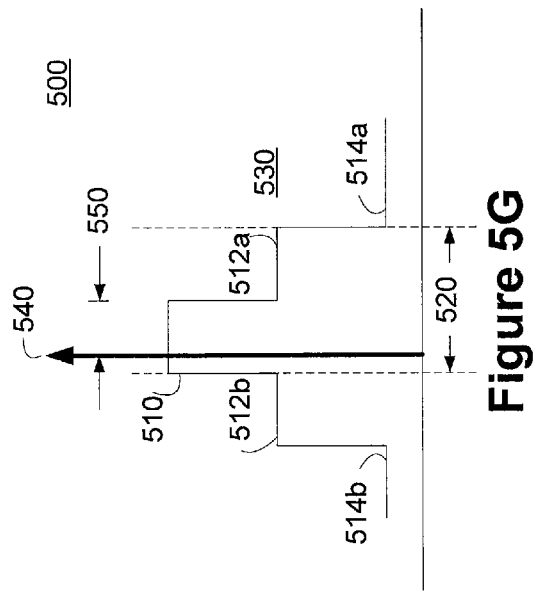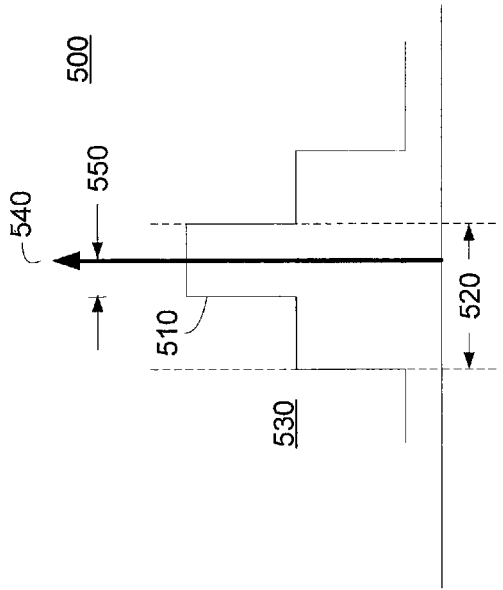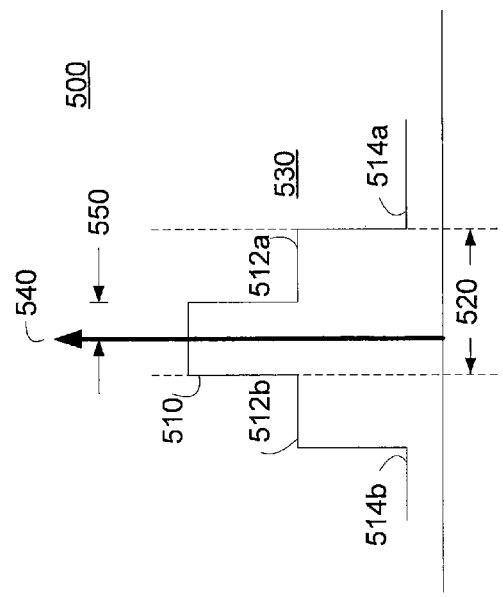

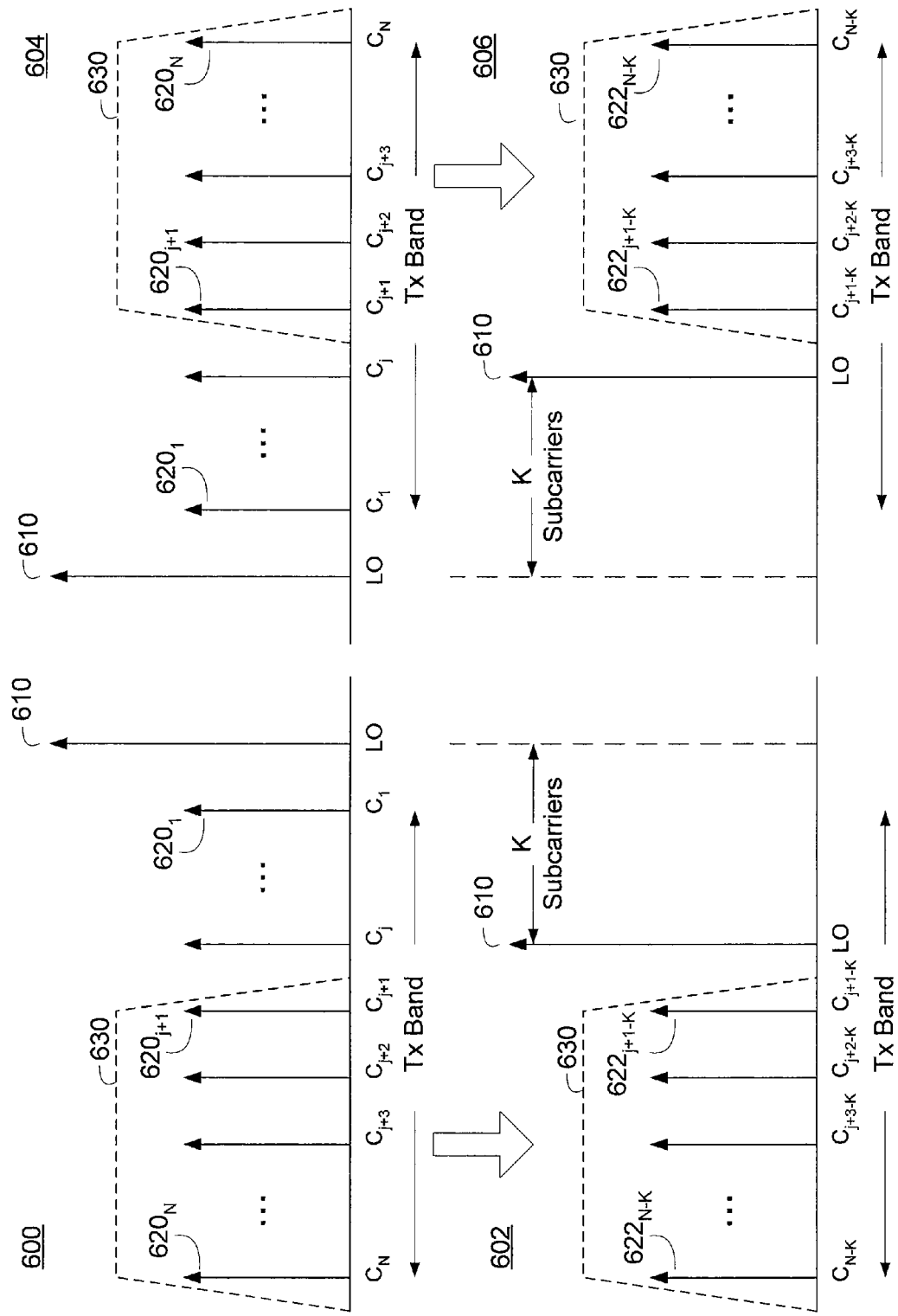

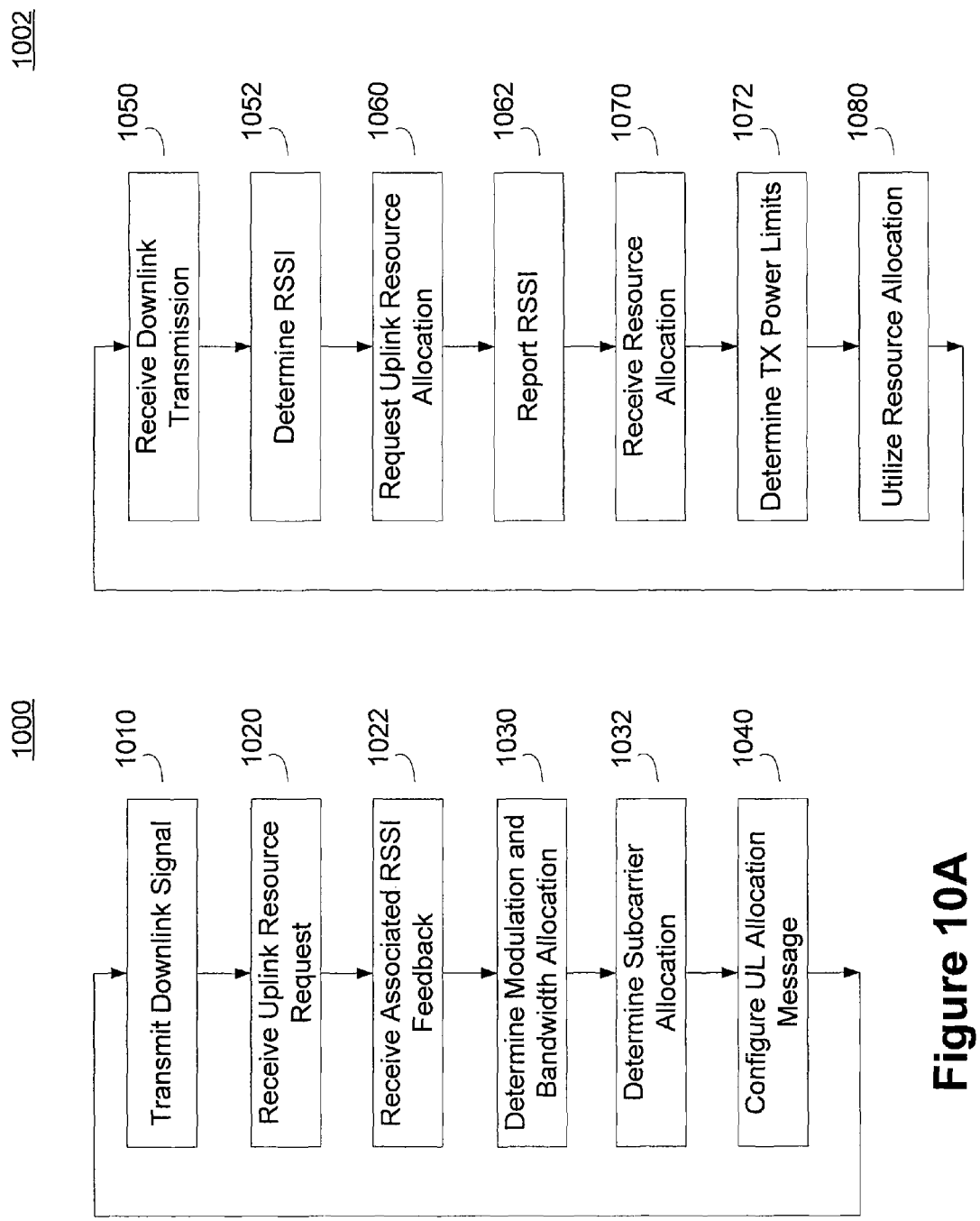

TRANSMIT POWER DEPENDENT REDUCED EMISSIONS FROM A WIRELESS TRANSCEIVER

FIELD OF THE INVENTION

The present disclosure concerns methods, apparatus, and systems for reduction of transmit emissions from a wireless transceiver operating in a wireless communication system.

BACKGROUND

Wireless communication systems are typically designed to operate in harsh environments under stringent constraints. The harsh environments include harsh physical environments and operating conditions as well as harsh electrical environments.

Wireless communication systems are typically constrained to operating in specified frequency bands, which may be licensed or unlicensed frequency bands. Wireless receivers need to have the ability to support communication links in the presence of in-band noise and interference sources as well as out of band interference and noise sources. Similarly, wireless transmitters need to have the ability to support communication links while operating within emissions limits. The emission limits defined in an operating specification or standard may constrain in-band emissions as well as out of band emissions.

A wireless transmitter may be limited to a maximum radiated power in the operating band. Where the transmit band is frequency division multiplexed, the transmitter contribution to adjacent channel interference is typically constrained. The transmitter out of band emissions are also typically constrained, such that the transmitter does not contribute significant interference to frequency bands that may be dedicated to different communication systems operating under different standards.

The wireless communication system, and in particular the transmitters in a wireless communication system, typically are designed to comply with out of band emission constraints under worst case operating conditions. Typically, a transmitter generates the highest level of out of band emissions when operating at a maximum transmit power level.

Under worst case conditions, a transmitter may be required to have over 100 db of difference between the transmit power level and the permissible out of band power emissions level. The transmitter's ability to meet an out of band emissions constraint is further complicated by the proximity of the operating frequency with the band edges. The ability to successfully limit out of band emissions is degraded as the transmitter operating frequency nears the band edges.

Various brute force techniques are known for limiting out of band emissions. However the application of the various techniques in an attempt to satisfy an emissions constraint may substantially degrade transmitter performance to a point that makes the brute force solution impractical.

For example, series filtering can be added to a transmitter to increase the rejection of out of band emissions. However, because filters contribute some level of passband attenuation, the requisite level of out of band rejection may substantially limit the transmit power capabilities of the transmitter. Similarly, the proximity of a transmit operating band to an emissions limited band may make implementation of a high order filter impractical.

Other techniques for reducing out of band emissions in a specified band, such as transmitting over a different operating frequency or implementing a different modulation technique, may be impractical for use in licensed or otherwise regulated bands, where the transmit band and operating parameters are standardized or otherwise specified.

It is desirable to reduce out of band emission while maintaining the ability to satisfy the various requirements set forth in an operating standard or specification.

BRIEF SUMMARY

Methods and apparatus for reducing transmit emissions are described herein. The transmit out of band emissions in an adjacent band can be reduced while complying with existing wireless communication standards through the utilization of one or more of: reduced transmit bandwidth, transmit operating band offset, and channel index remapping. A transceiver can be configured to operate with asymmetric transmit and receive operating bands. The transceiver can support a receive operating band that is substantially adjacent to a frequency band configured for alternative services. The transmit operating band can be offset from an adjacent frequency band, and can use a narrower operating band than is supported by the receiver. The transmit baseband signal can have a reduced bandwidth to reduce the amount of noise. The frequency offset can introduce a larger transition band between the transmit operating band edges and the adjacent frequency band of interest. The transceiver can remap channel assignments to compensate for the frequency offset such that the frequency offset introduced in the transmitter is transparent to channel allocation.

Methods and apparatus for reducing out of band emissions through selective resource allocation, transmit power control, or a combination thereof. A resource controller, such as a base station, can allocate uplink resources to a requesting subscriber station based in part on an expected transmit power. The base station can allocate uplink bandwidth to the subscriber station based on an expected subscriber station uplink transmit power and a frequency of a restricted emissions band. Those subscriber stations having higher expected transmit powers are allocated bandwidth further from the restricted emissions band. The subscriber station can perform complementary transmit power control based on allocated uplink resources. The subscriber station can limit a transmit power based in part on a bandwidth allocation, modulation type allocation, or some combination thereof.

Aspects of the present disclosure include a method of reducing out of band emissions. The method includes receiving an uplink resource request, receiving a power control metric, and determining an uplink resource allocation based at least in part on the uplink resource request and the power control metric.

Aspects of the present disclosure include a method of reducing out of band emissions. The method includes receiving a downlink transmission, requesting uplink resources, receiving a resource allocation based on the uplink resource request, and determining a transmit power constraint based at least in part on the resource allocation.

Aspects of the present disclosure include an apparatus for reducing out of band emissions by a subscriber station that includes a transmitter configured to transmit a downlink transmission, a receiver configured to receive an uplink resource request and further configured to receive a power metric based on the downlink transmission, and an uplink resource controller configured to determine an uplink resource allocation based at least in part on the uplink resource request and the power metric, generate an uplink resource message having the uplink resource allocation, and couple the uplink resource message to the transmitter.

Aspects of the present disclosure include an apparatus having reduced out of band emissions that includes a receiver configured to receive a downlink transmission, a power detector configured to determine a power metric based on the downlink transmission, and a transmitter configured to transmit an uplink resource request and a feedback message based on the power metric. The receiver receives a resource allocation based in part on the uplink resource request and the feedback message, and wherein the transmitter is constrained to a maximum transmit power determined based on the resource allocation.

BRIEF DESCRIPTION OF THE DRAWINGS

The features, objects, and advantages of embodiments of the disclosure will become more apparent from the detailed description set forth below when taken in conjunction with the drawings, in which like elements bear like reference numerals.

FIGS. 5A-5H are simplified spectrum diagrams illustrating examples of the transmit signal.

FIGS. 6A-6D are simplified spectrum diagrams illustrating channel index remapping.

FIGS. 10A and 10B are simplified flowcharts of embodiments of processes of channel allocation with reduced out of band uplink emissions.

DETAILED DESCRIPTION OF EMBODIMENTS OF THE INVENTION

Figure 1:
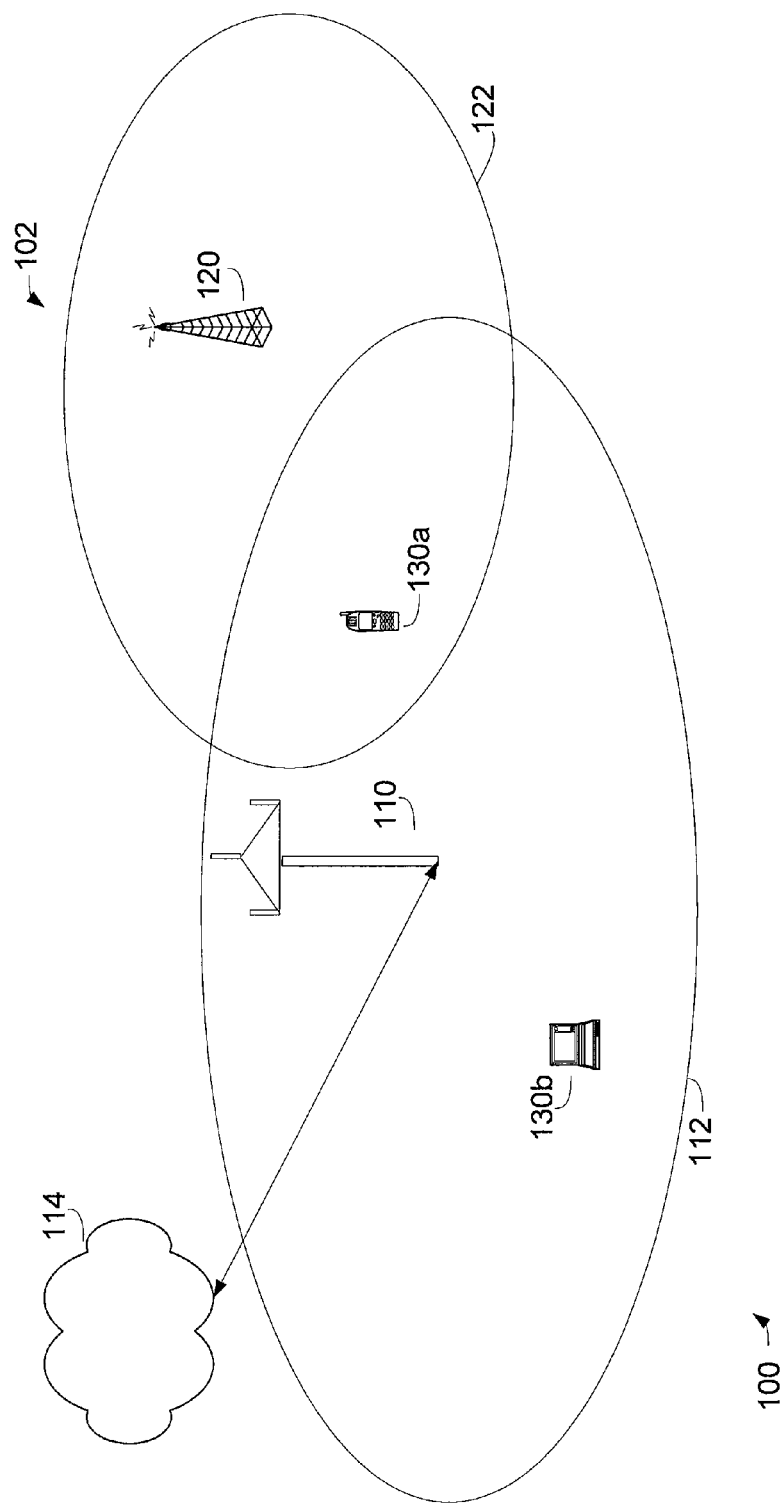
FIG. 1 is a simplified functional block diagram of an embodiment of a wireless communication system in a mixed signal environment.

Methods and apparatus for reducing transmit emissions are described herein. The transmit out of band emissions in an adjacent band can be reduced while complying with existing wireless communication standards through the utilization of one or more of: reduced transmit bandwidth, transmit operating band offset, and channel index remapping.

The transmit emissions in an adjacent channel can be reduced by reducing the bandwidth of the useable transmit operating band. In a wireless communication system having a number of Frequency Division Multiplex (FDM) channels distributed across a transmit operating band, a transmitter can reduce out of band emission by selectively limiting the FDM channels that can be populated. Similarly, in a wireless communication system having a wideband signal occupying a transmit operating band, a transmitter can selectively configure the transmit signal to occupy a portion of the transmit band. Decreasing the amount of the transmit spectrum that is occupied allows for a greater transition band between the transmit signal and an adjacent band in which emissions are constrained.

The transition band can be further increased by offsetting the transmit signal in the occupied portion of the transmit band away from the adjacent band in which emissions are constrained. The transmit signal can be offset in the transmit band, for example, by offsetting a frequency of a Local Oscillator (LO) used to frequency translate a signal to the transmit band.

The transmitter can use one or more narrower filters in the transmit signal path to capitalize on the narrower bandwidth of the transmit signal. For example, occupying only a portion of the full transmit band results in a narrower RF bandwidth, and the transmitter can implement a narrower RF filter. The transmitter can also, particularly in the case of a wideband signal, implement a narrower baseband filter. The transmitter can implement a narrower baseband signal that has its passband narrowed to correspond to the portion of the transmit band occupied by the selectively narrowed transmit signal.

The transmitter can implement narrowing and frequency offset of the transmit signal in a manner that requires no knowledge on the part of a corresponding transceiver that is in communication with the transmitter. For example, the modified transmitter having reduced out of band emissions can be implemented in a subscriber station, and a base station in communication with the subscriber station can have no knowledge regarding the techniques implemented by the transmitter to reduce out of band emissions.

In a wireless communication system in which the base station allocates the transmit resources to the subscriber station, such as one or more frequencies in the transmit band, the subscriber station may remap the received resource allocation in order to compensate for the frequency offset introduced in the transmitter. However, the base station may be limited to allocating resources within an allocatable portion of the transmit operating band supported by the transmitter. The base station can allocate resources in a manner that has no knowledge regarding the frequency offset introduced by the transmitter. The transmitter can remap the allocation internally to compensate for the locally introduced frequency offset.

The methods and apparatus for reducing transmit emissions are described herein in the context of an Orthogonal Frequency Division Multiplex (OFDM) transceiver operating in accordance with a predetermined wireless communication standard, such as IEEE 802.16, Air Interface For Fixed Broadband Wireless Access Systems. For example, the transceiver can be configured to operate in accordance with the Wireless Metropolitan Area Network, Orthogonal Frequency Division Multiple Access physical layer (WirelessMAN OFDMA PHY) defined in the standard.

The methods and apparatus described herein are not limited to application in an IEEE 802.16 transceiver, nor are the methods and apparatus limited to application in an OFDM system. The wireless communication system and implementation set forth herein are provided as illustrative examples and are not to be construed as limitations on the application of the methods and apparatus described herein.

FIG. 1 is a simplified functional block diagram of an embodiment of a wireless communication system 100 in a mixed signal environment. The wireless communication system 100 operates in the presence of a wireless system 102 operating in a frequency spectrum in which emissions of the wireless communication system 100 are constrained or otherwise limited. In one embodiment, the operating band of the wireless communication system 100 is adjacent the operating band of the wireless system 102, and the coverage areas, 112 and 122, supported by the respective systems at least partially overlap.

The wireless communication system 100 includes a base station 110 supporting a corresponding service or coverage area 112. The base station 110 can be coupled to a network 114, such as a wired network, and can be configured to allow wireless communication with devices (not shown) in communication with the network 114.

The base station 110 can communicate with wireless devices within its coverage area 112. For example, the base station 110 can wirelessly communicate with a first subscriber station 130a and a second subscriber station 130b within the coverage area 112. In another example, the first subscriber station 130a can communicate with a remote device (not shown) via the base station 110. In another example, the first subscriber station 130a can communicate with the second subscriber station 130b via the base station 110.

The base station 110 can be one of a plurality of base stations that are part of the same communication network. The base station 110 can be in communication with one or more other base stations (not shown) either through a direct communication link or via an intermediary network. The base station 110 alternatively can be referred to as an access point or node.

The base station 110 can be configured to support an omnidirectional coverage area or a sectored coverage area. For example, the base station 110 can support a sectored coverage area 112 having three substantially equal sectors. The base station 110 treats each sector as effectively a distinct coverage area. The number of sectors in the coverage area 112 and is not a limitation on the operation of the methods and apparatus for reducing transmit emissions described herein.

Although only two subscriber stations 130a and 130b are shown in the wireless communication system 100, the system can be configured to support virtually any number of subscriber stations. The subscriber stations 130a and 130b can be mobile stations or stationary stations. The subscriber stations 130a and 130b alternatively can be referred to, for example, as mobile stations, mobile units, or wireless terminals.

A mobile station can be, for example, a wireless handheld device, a vehicle mounted portable device, or a relocatable portable device. A mobile subscriber station can take the form of, for example, a handheld computer, a notebook computer, a wireless telephone, or some other type of mobile device.

In one example, the wireless communication system 100 is configured for OFDM communications substantially in accordance with a standard system specification, such as IEEE 802.16 or some other wireless standard. The wireless communication system 100 can support the methods and apparatus for reducing transmit emissions described herein as an extension to the system standard or fully compliant with the system standard.

The base station 110 is configured to transmit data packets to the subscriber stations 130a and 130b organized in frames using one or more slots. The term "downlink" is used to refer to the direction of communication from the base station 110 to a subscriber station, e.g. 130a. Each slot can include a predetermined number of OFDMA subcarriers, Orthogonal Frequency Division Multiplex (OFDM) symbols, or a combination of subcarriers and symbols.

Each base station 110 can supervise and control the communications within its respective coverage area 112. Each active subscriber station, for example 130a, registers with the base station 110 upon entry into the coverage area 112. The subscriber station 130a can notify the base station 110 of its presence upon entry into the coverage area 112, and the base station 110 can interrogate the subscriber station 130a to determine the capabilities of the subscriber station 130a.

In a packet based wireless communication system 100, it may be advantageous for the system to allocate resources as needed, rather than maintaining an active channel assignment for each subscriber station 130a or 130b having an established communication session with the base station 110. The base station 110 can allocate resources to the subscriber station 130a on an as needed basis. For example, in an OFDMA system, the base station 110 can allocate time and frequency resources to each subscriber station, e.g. 130a, when the subscriber station 130a has information to send to the base station 110.

The communication link from the subscriber station 130a to the base station 110 is typically referred to as the "uplink." The base station 110 can allocate uplink resources to the subscriber station 130a to avoid collisions that may occur if the subscriber stations 130a or 130b are allowed random access to the resources. The base station 110 can allocate the uplink resources in units of symbols and OFDMA subcarriers.

The wireless communication system 100 can also have the ability to modify or otherwise dynamically select other parameters related to the downlink and uplink communication links. For example, the base station 110 can determine a modulation type and encoding rate from a plurality of modulation types and encoding rates. The base station 110 can be configured to select from a predetermined number of modulation types that can include Quadrature Phase Shift Keying (QPSK) and various dimensions of Quadrature Amplitude Modulation (QAM), such as 16-QAM and 64-QAM.

Each modulation type can have a limited number of available encoding rates. For example, QPSK modulation can be associated with rate ½ or rate ¾ encoding, 16-QAM can be associated with rate ½ or rate ¾ encoding, and 64-QAM can be associated with rate ½, rate ⅔, or rate ¾ encoding. Thus, in this example, the base station 110 can select a modulation type-encoding rate pair from a possible seven different types.

The base station 110 can communicate the modulation type-encoder rate pair to a subscriber station 130a or 130b in an overhead message. In one embodiment, the overhead message can be a broadcast message that includes resource allocation information. For example, the overhead message can include the timing, modulation type-encoder rate pair, and slot information allocated to each of the subscriber stations 130a and 130b in the current frame or one or more subsequent frames. The base station 110 can associate particular information with a subscriber station identifier to allow the receiving subscriber stations 130a and 130b to determine which resources are allocated to them.

The base station 110 can transmit the overhead message using a predetermined modulation type and encoder rate, such that the subscriber stations 130a and 130b know, a priori, how to process the overhead message. For example, the base station 110 can transmit the overhead messages using the lowest data rate, that is, QPSK at rate ½.

In one embodiment, the base station 110 is configured to allocate uplink resources to the subscriber station 130a in accordance with the IEEE802.16 standard for OFDMA physical layer communications. The base station 110 sends an Uplink-Map (UL-MAP) in each frame, where a frame of information spans a predetermined time. In one embodiment, each frame time division multiplexes a predetermined downlink time portion and a predetermined uplink portion in a time division duplex (TDD) fashion. In other embodiments, the uplink and downlink time portions may occur during at least partially overlapping time assignments, but may be separated in frequency in a frequency division duplex (FDD) fashion.

In a TDD system, the base station 110 and subscriber stations 130a and 130b alternate between transmitting and receiving over the same operating frequencies. The downlink and uplink periods are typically mutually exclusive to minimize collisions and interference. Where the wireless communication system 100 is configured to operate in accordance with the IEEE802.16 WirelessMAN OFDMA PHY, the complete set of OFDMA subcarriers span substantially the entire operating frequency band. The uplink resources assigned to a particular subscriber station, e.g. 130a, may span substantially the entire operating frequency band or only a portion of the operating frequency band. As will be described in more detail below, the base station 110 can be configured to operate in a predetermined mode in which the base station 110 allocates uplink resources to subscriber stations 130a and 130b in predetermined portions of the operating frequency band, corresponding to a predetermined subset of OFDMA subcarriers. Selective allocation of uplink resources can substantially contribute to the reduction of out of band emissions.

The wireless communication system 100 can operate in the presence of a wireless system 102 supporting a corresponding coverage area 122 that at least partially overlaps the coverage area 112 supported by the base station 110. The wireless system 102 can operate over an operating frequency band that is substantially adjacent the operating frequency band of the wireless communication system 100. The wireless system 102 may operate in a licensed or otherwise regulated operating frequency band. The regulations or standards applicable to the wireless system 102 may constrain the level of emissions from sources outside the operating frequency band of the wireless system 102. The regulations relating to operating in a given spectrum may limit the level of permissible out of band emissions.

Thus, the level of out of band emissions permitted of the wireless communication system 100 may be constrained by the regulations regarding allowable emissions in the adjacent operating frequency band of the wireless system 102. The wireless communication system 100 may be constrained to a permissible level of out of band emissions for both the downlink and the uplink. The out of band emission constraints can be the same for the downlink and the uplink or can be different.

The base station 110 and the subscriber stations 130a and 130b may have differing abilities to comply with an out of band emission constraint. The size and resources available to a base station 110 may allow for more solutions than are available to a subscriber station, e.g. 130a, that can be a mobile terminal. Thus, the solutions for satisfying a particular out of band emission constraint may be different in the base station 110 and the subscriber stations 130a and 130b, even if the downlink and uplink constraints are the same.

In one embodiment, each of the subscriber stations 130a and 130b can determine its respective operating frequency band. The subscriber stations 130a and 130b can also determine the base station 110 and corresponding coverage area 112 or sector in which they are operating. Each subscriber station 130a and 130b can individually determine whether to institute emission reduction techniques based on the operating frequency, base station 110, and corresponding coverage area 112 or sector of a coverage area.

For example, a first subscriber station 130a may determine that it is operating within a frequency band within the sector of a coverage area 112 of a base station 110. The first subscriber station 130a may institute transmit emission reduction based on a portion or a combination of this information. The first subscriber station 130a may selectively institute enhanced transmit emission reduction, because some or all of the emission reduction techniques may result in reduced uplink bandwidth.

Similarly, the second subscriber station 130b may determine, based on the operating frequency, sector of coverage area 112, and base station 110, that it does not need to initiate enhanced transmit emission reduction techniques. The second subscriber station 130b can continue to operate using default transmit emissions and the default emission reduction techniques.

The first subscriber station 130a limits its uplink bandwidth when in the enhanced emission reduction state. The base station 110 operates in a mode that restricts the uplink bandwidth and associated uplink resources that can be allocated to a subscriber station. The base station 110 can be predetermined or otherwise controlled to limit the amount of uplink bandwidth and corresponding portion of the uplink operating band allocated to subscriber stations in the emission reduction state. In embodiments where the base station 110 does not control uplink resource allocation, the subscriber station 130a limits its uplink bandwidth and portion of uplink operating band.

For example, the base station 110 operating as an IEEE 802.16 base station can be configured to operate the uplink in an Adaptive Modulation and Coding (AMC) mode. In AMC mode, the base station 110 controls an adjacent subcarrier permutation scheme, where adjacent subcarriers are used to form subchannels.

With the AMC permutation scheme, adjacent subcarriers are assigned to a subchannel and the pilot and data subcarriers are assigned fixed positions in the frequency domain within an OFDMA symbol. The AMC permutation is the same for both uplink and downlink. When AMC permutation is used in a downlink or an uplink subframe, the base station 110 indicates the switch to the AMC permutation zone by using a zone switch Information Element (IE).

With the AMC permutation scheme, a set of nine contiguous subcarriers within an OFDMA symbol is referred to as a "bin." In each bin there is 1 pilot subcarrier and 8 data subcarriers. A bin is a basic allocation unit both in downlink and uplink to form an AMC subchannel.

An AMC subchannel consists of 6 contiguous bins, that may span over multiple OFDMA symbols. An AMC subchannel of type N*M, where N*M=6, refers to an AMC subchannel with N bins by M symbols. The 802.16e OFDMA PHY defines 3 AMC subchannel types, i.e., 1*6, 2*3, and 3*2. All AMC subchannels in an AMC zone have the same type of N*M, which is specified in a Zone Switch Information Element. Depending on the AMC subchannel type (i.e., N*M), an AMC slot can be 1 subchannel by 2, or 3, or 6 OFDMA symbols.

The AMC subcarrier allocation parameters are summarized in Table 1.

TABLE 1

AMC Subcarrier Allocation Parameters

| Parameters | Values FFT size | | | |
|---|---|---|---|---|
| | 128 | 512 | 1024 | 2048 |
| Number of Guard subcarriers | 19 | 79 | 159 | 319 |
| Number of pilot subcarriers | 12 | 48 | 96 | 192 |
| Number of data subcarriers | 96 | 384 | 768 | 1536 |
| Number of bins | 12 | 48 | 96 | 192 |
| Number of subchannels of type 1 * 6 (i.e., over 6 symbols) | 12 | 48 | 96 | 192 |
| Number of subchannels of type 2 * 3 (i.e., over 3 symbols) | 6 | 24 | 48 | 96 |
| Number of subchannels of type 3 * 2 (i.e., over 2 symbols) | 4 | 16 | 32 | 64 |

The base station 110 operating in AMC mode, can be configured to limit the number and placement of bins that can be allocated to the first subscriber station 130a. Thus, the base station 110 limits the available uplink bandwidth. The downlink bandwidth, from the base station 110 to the first subscriber station 130a, need not be limited and can span the entire operational band. The downlink and uplink bandwidths are not required to be symmetrical. If the base station 110 operates with substantially the full operating bandwidth in the downlink and limits the uplink bandwidth, the system is asymmetric.

The first subscriber station 130a can limit the baseband bandwidth to a bandwidth that is sufficient to pass the reduced uplink signal. The first subscriber station 130a can vary the bandwidth dynamically, based on the uplink resource allocation received from the base station, or can set the bandwidth when in the reduced emission mode to a predetermined bandwidth based on a maximum allocatable uplink bandwidth in reduced emission mode. Because the uplink bandwidth is less than the full operating bandwidth in reduced emission mode, the first subscriber station 130a can be configured to set the baseband bandwidth to less than the full operational bandwidth that is available when not operating in reduced emissions mode.

The first subscriber station 130a can also be configured to offset the uplink frequency translation in order to offset a center frequency relative to the band edge nearest the emissions band of interest. Thus, if the emissions band of interest is in a band above the transmit band, the first subscriber station 130a can offset the center frequency of the uplink signal down in frequency and away from the emission band of interest. Alternatively, if the emissions band of interest is below the transmit band, the first subscriber station 130a can offset the center frequency of the transmit signal up in frequency and away from the emission band of interest.

The magnitude of the frequency offset is largely determined based on the allocated uplink bandwidth. Again, the first subscriber station 130a can determine the magnitude of the frequency offset dynamically based on the uplink allocation. Alternatively, the first subscriber station 130a can determine the magnitude of the frequency offset based on the maximum allocatable uplink bandwidth in reduced emission mode. The magnitude of the frequency offset is limited by the width of the transmit band. The magnitude of the frequency offset should not exceed the offset that places the edge of the uplink signal at the band edge.

The first subscriber station 130a can further limit the magnitude of the frequency offset based on the uplink resources allocated to it by the base station 110. The base station 110 may allocate particular OFDMA subcarriers, positioned at particular frequencies in the transmit band. The first subscriber station 130a may limit the magnitude of the frequency offset to an offset that allows the first subscriber station 130a to perform subcarrier remapping.

In subcarrier remapping, the first subscriber station 130a remaps the uplink subcarrier indices allocated to it by the base station 110 in order to compensate for the frequency offset introduced local to the subscriber station. By utilizing subcarrier remapping, the frequencies of the subcarriers allocated to the first subscriber station 130a remain consistent with the indexing scheme used by the base station 110, even though the first subscriber station 130a has shifted the center frequency of the uplink signal. With subcarrier remapping, the base station has no knowledge of various techniques utilized by the first subscriber station 130a in reducing the transmit emissions. Therefore, the base station 110 need not perform any additional signal processing, which may require an extension to the system standard, in order to communicate with a subscriber station operating in reduced emissions mode.

Figure 2:
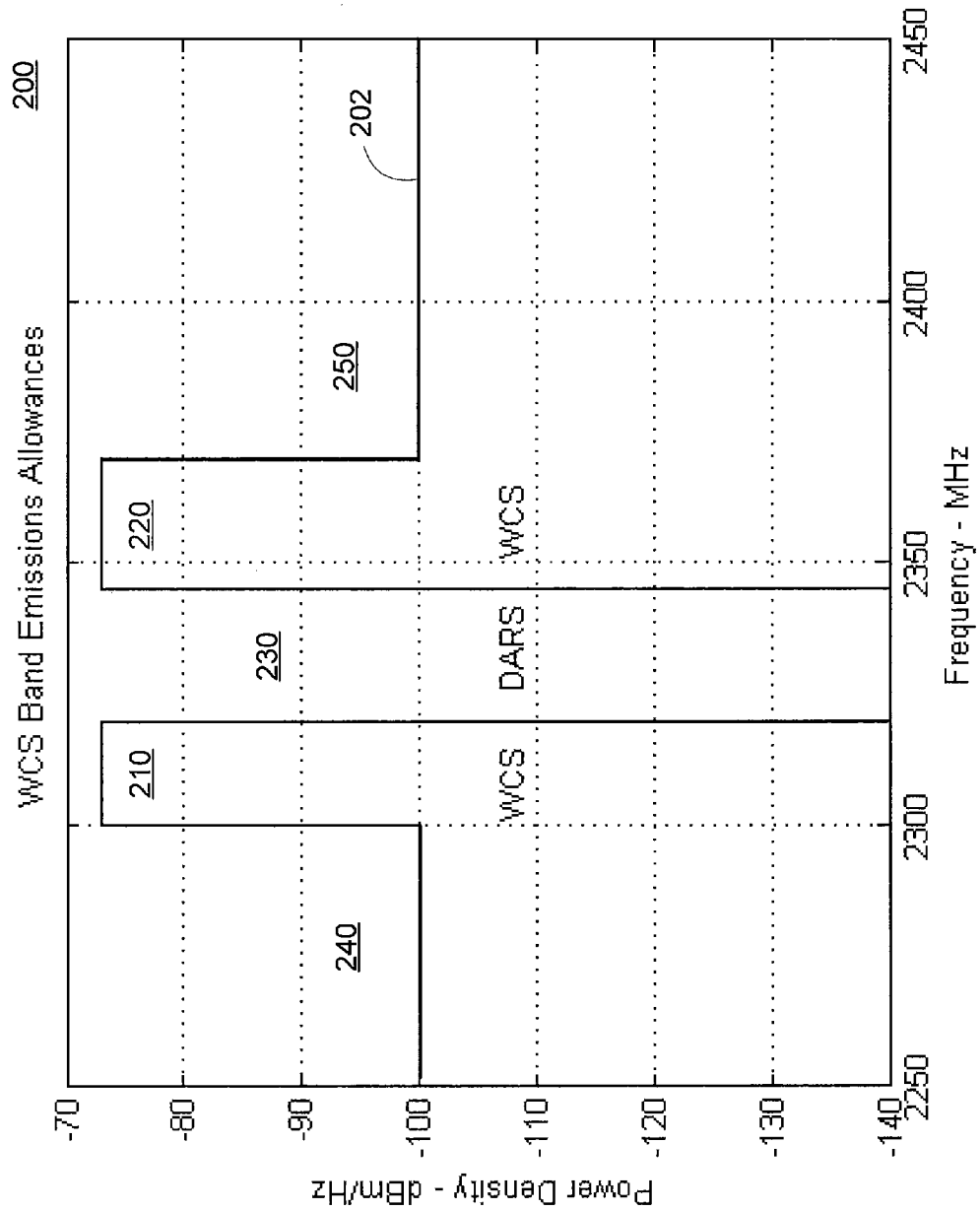
FIG. 2 is a simplified diagram of an embodiment of a transmit emission mask.

FIG. 2 is a simplified spectrum diagram 200 illustrating an embodiment of a transmit emission mask 202. The horizontal axis denotes frequency, in terms of MHz, and the vertical axis denotes power density, in terms of dBm/Hz. The spectrum diagram 200 illustrates permissible power densities in two distinct Wireless Communication Services (WCS) operating bands, 210 and 220, that are adjacent to a Digital Audio Radio Service (DARS) band 230.

The first and second WCS bands, 210 and 220, span the frequencies from 2305-2320 MHz and 2345-2360 MHz. In the United States, the first and second WCS bands 210 and 220 include four distinct frequency blocks, designated A-D. The A and B frequency blocks are each paired frequency blocks, while the C and D frequency blocks are unpaired. The A frequency block includes the pair 2305-2310 MHz and 2350-2355 MHz. The B frequency block includes the pair 2310-2315 MHz and 2355-2360 MHz. The C frequency block includes 2315-2320 MHz and the D frequency block includes 2345-2350 MHz.

The transmit mask 202 is overlaid the frequency bands. As can be seen, the upper band edge of the first WCS band 210 and the lower end of the second WCS band 220 are adjacent to the DARS band 230. The level of signal rejection required at the WCS band edges of interest are nearly 70 dB. The C block in the first WCS band 210 and the D block in the second WCS band 220 are immediately adjacent the DARS band 230 and experience the greatest constraints on out of band emissions due to the proximity to the DARS band 230 with the onerous emissions constraint. The emissions requirement in the band 240 below the first WCS band 210 and in the band 250 above the second WCS band 220 are not as onerous as the emissions constraints in the DARS band 230.

Thus, subscriber stations operating in the A or B blocks may not need to institute a reduced emissions mode, while subscriber stations operating in the C or D blocks may be configured to support the low emissions mode. Subscriber stations operating in the C block of the first WCS band 210 seek to limit out of band emissions above the upper edge of the band, while subscriber stations operating in the D block of the second WCS band 220 seek to limit the out of band emissions in below the lower edge of the band.

Figure 3:
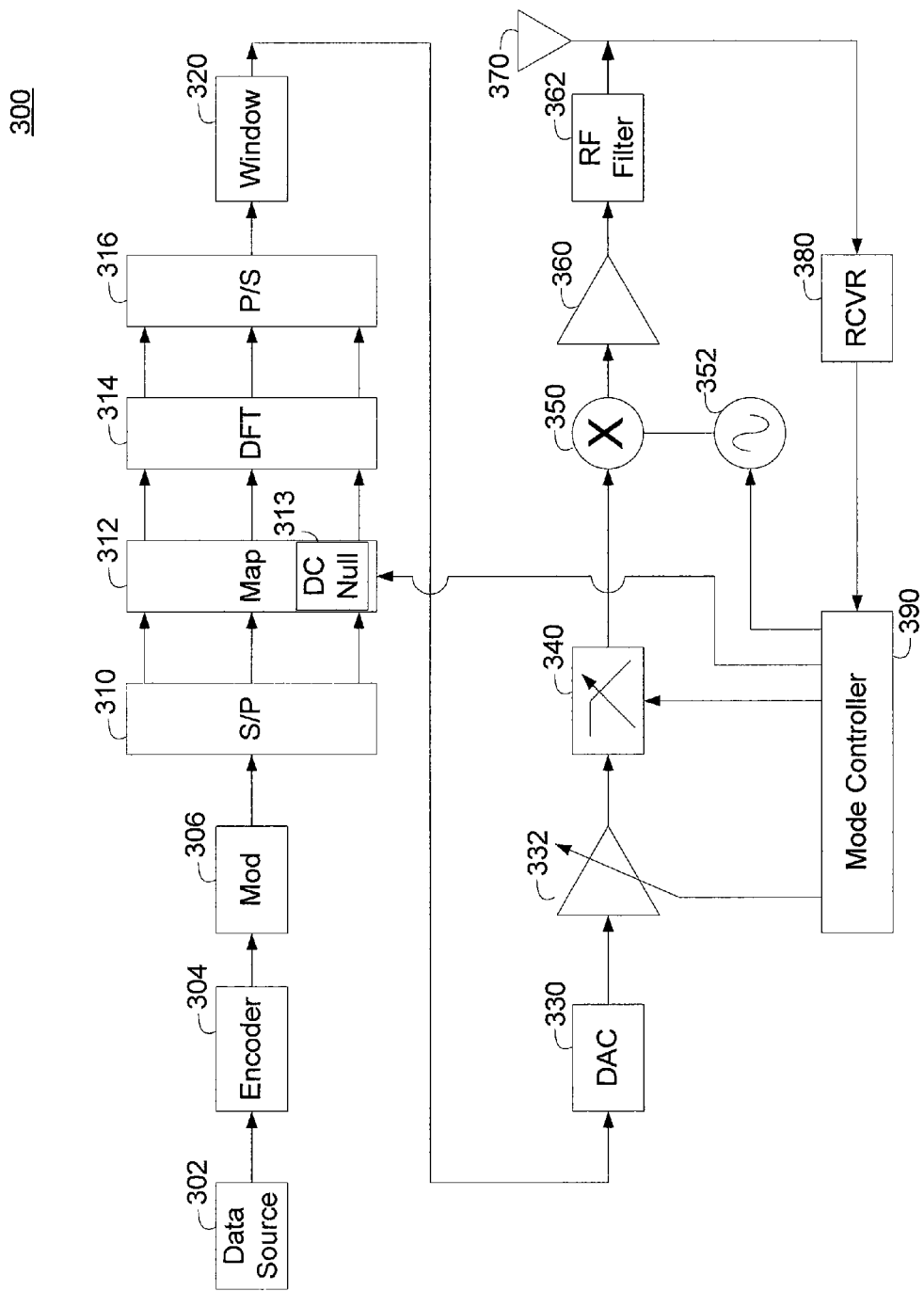
FIG. 3 is a simplified function block diagram of an embodiment of a transceiver.

FIG. 3 is a simplified function block diagram of an embodiment of a transceiver 300 configured or selectively controlled to operate in a reduced emission mode. The transceiver 300 can be implemented in the wireless communication system of FIG. 1, and can be implemented in a base station or one or more subscriber stations illustrated in FIG. 1. The transceiver 300 described below is described in the context of a subscriber station operating in an IEEE802.16 wireless communication system, but the described techniques for reducing out of band emissions are not limited to application in a subscriber station nor are they limited to application in an IEEE802.16 wireless communication system.

The transceiver 300 includes a transmitter portion and a receiver 380 coupled to an antenna 370. In an embodiment, the transmitter portion and the receiver 380 operate in a Time Division Duplex (TDD) manner, in which the transmitter portion and the receiver 380 alternate in time the use of the same frequency band.

Although FIG. 3 depicts each data stream in transceiver 300 with a single communication path, some of the communication paths may represent complex data, and a signal path for complex data may be implemented using a plurality of communication paths. For example, a complex communication path can include a first communication line to communicate the real part or in-phase component of the complex data and a second complex communication line to communicate the imaginary part or quadrature component of the complex data. Similarly, in a polar representation of complex data, a first communication line can be used to communicate a magnitude of the complex data and a second communication line can be used to communicate a corresponding phase of the complex data.

The transmitter portion includes a data source 302 that is configured to generate or receive data or information that is to be transmitted to a destination at or via a base station. The data source 302 can generate data internal to a subscriber station such as, for example, internal performance metrics. Alternatively or additionally, the data source 302 can be configured to accept data or other information from a an external source, via an input port or some other data interface.

In the embodiment of FIG. 3, the data output from the data source 302 is a stream of data in digital format. The data source 302 can be configured to receive or otherwise generate the digital data format. In embodiments where the data source 302 receives one or more analog signals, the data source 302 can include an Analog to Digital Converter (ADC) (not shown) to convert the signals to a digital format.

The output of the data source 302 is coupled to an encoder 304 that can be configured to encode the uplink data according to a specified encoding rate and type. For example, a base station can allocate uplink resources to the transceiver 300 and can specify a type of encoding and corresponding encoding rate from a set of encoding rates and types. In other embodiments, the encoder 304 is configured to perform a predetermined encoding function.

The encoder 304 can be configured to perform, for example, block interleaving, block coding, convolutional coding, turbo coding, and the like, or some combination of coding types. Additionally, for each coding type, the encoder 304 may have the ability to encode the data at any one of a plurality of encoding rates.

The output of the encoder 304 is coupled to a modulator 306 that can be configured to modulate the encoded data according to one of a plurality of modulation types. As described above, the base station can specify a modulation type in addition to specifying the encoding rate. The modulation type can be selected from the list including QPSK, QAM, 16-QAM, 64-QAM, and the like, or some other modulation type. In other embodiments, the modulator 306 is configured to modulate the encoded data according to a fixed modulation type.

The output of the modulator 306 is coupled to a serial to parallel converter 310. In one embodiment, the serial to parallel converter 310 can be controlled to generate a number of parallel paths determined based on the number of available subcarriers of an OFDM system that can be used to carry information.

The output of the serial to parallel converter 310 is coupled to a signal mapper 312. The signal mapper 312 is configured to selectively map the parallel signals to the subcarriers allocated to the transceiver 300 by the base station. The signal mapper 312 can be configured to map to any one of a plurality of subcarrier sets. For example, the transceiver 300 can be selectively controlled to support generation of an OFDM symbol having up to 128, 512, 1024, 2048, or some other selectable number of subcarriers.

The transceiver 300 receives the dimension of the subcarriers in a control message and can configure the signal mapper 312 to map the data to the subcarriers allocated by the base station. The signal mapper 312 can be configured to determine the subcarrier mapping based on control signals, messages, or levels provided by a mode controller 390. In some embodiments, the functions of the serial to parallel converter 310 and signal mapper 312 can be combined in the signal mapper 312, and a distinct serial to parallel converter 310 can be omitted.

The signal mapper 312 can also include a DC null module 313 or otherwise be configured to null a particular subcarrier within the OFDM symbol. The position of the subcarrier corresponding to the DC subcarrier can be determined, based in part on one or more control signals, and can depend at least in part on a subcarrier remapping that occurs as a result of a frequency offset introduced into a LO frequency. The DC null module 313 can be configured, for example, to null or otherwise attenuate any sample values that would otherwise map to a DC subcarrier.

The DC null module 313 is illustrated as implemented within the signal mapper 312. However, other embodiments can introduce the DC null module 313 within some other position in the signal path. For example, the DC null module 314 may be implemented within a subsequent DFT module 314, in an RF signal path, in some other signal processing module, or in a combination of signal processing modules.

The output of the signal mapper 312 is coupled to a transform module 314. The transform module 314 can be configured to generate an OFDM symbol based on the parallel inputs. The transform module 314 can be configured, for example, to perform a Discrete Fourier Transform (DFT), Fast Fourier Transform (FFT), and the like, or some other transform configured to generate the desired symbol.

The output of the transform module 314 is coupled to a parallel to serial converter 316 that is configured to generate a serial data stream from the parallel output of the transform module 314. The serial signal stream from the parallel to serial converter 316 is coupled to a windowing module 320 that is configured to perform windowing or filtering of the serial signal stream. The windowing module 320 can implement a window response that is controllable. In one embodiment, the windowing module 320 can be configured as a digital filter having a programmable bandwidth and response. The bandwidth of the digital filter can be dynamically scaled based on the transmit data bandwidth.

The output of the windowing module 320 is coupled to a Digital to Analog Converter (DAC) 330. The DAC 330 converts the digital signal stream to an analog signal stream. The analog output from the DAC 330 is coupled to a variable gain amplifier (VGA) 332. The gain of the VGA 332 can be controlled by the mode controller 390 that can include a portion that operates on a feedback power control signal.

The output of the VGA 332 is coupled to a variable filter 340. The bandwidth of the variable filter 340 is controlled by the mode controller 390, and is controlled to reduce transmit emissions when the transceiver 300 operates in reduced emissions mode. The variable filter 340 is typically implemented as a low pass filter that operates on a baseband signal output from the VGA 332. However, the actual configuration of the variable filter 340 can be based on the spectrum of the signal from the VGA 332. In some embodiments, the variable filter 340 can be implemented as a band pas filter.

The filtered output from the variable filter 340 is coupled to a frequency converter, shown as a mixer 350 in the embodiment of FIG. 3. The frequency converter is not limited to a mixer 350, but can be some other type of frequency converter, such as a multiplier, upsampler, modulator, and the like, or some other manner of frequency conversion. The embodiment of FIG. 3 illustrates a direct conversion transmitter. However, the number of frequency conversion stages can be more than one, and the transmit signal can be frequency translated to an Intermediate Frequency (IF) that is less than or greater than the desired Radio Frequency (RF) prior to frequency translation to the desired RF in other embodiments.

In the embodiment shown in FIG. 3, the output of the variable filter 340 is coupled to an Intermediate Frequency (IF) port of the mixer 350. A signal from a controllable Local Oscillator (LO) 352 drives a LO port of the mixer 350. The signal is frequency converted to a Radio Frequency (RF) band, typically the desired transmit band of frequencies. The mixer 350 can be configured to generate a Single Side Band (SSB) version of the input signal. The mixer 350 can be configured to output an upper side band or a lower side band signal.

In an alternative embodiment, the mixer 350 is configured to directly modulate a complex signal from the variable filter 340 onto the output signal from the LO 352. The resultant output from the mixer 350 is a frequency converted version of the complex signal with a center frequency approximately equal to the frequency of the LO 352. In such an embodiment, the mixer 350 can include a first mixer configured to frequency convert an in-phase (I) signal component and a second mixer configured to frequency convert a quadrature (Q) signal component. The output of the first and second mixers are combined, for example using a signal summer. The mixer can also include a splitter configured to split or otherwise divide the LO signal into two signals. The mixer includes a phase shifter to phase shift a first of the LO signals by substantially 90 degrees relative to the second of the LO signal. The first and second LO signals are coupled to the LO input of the first and second mixers, respectively. The phases of the LO signals and the phases of the complex signal components may correspond or may be complementary. That is, the quadrature signal component may be upconverted using either the quadrature LO signal or the in-phase LO signal The in-phase signal component is then upconverted with the LO signal that is not used for the quadrature signal component.

The mode controller 390 controls the frequency of the LO 352. As will be discussed in further detail below, the frequency of the LO 352 is offset from a default frequency during operation in the reduced emissions mode.

The upconverted signal is coupled to a power amplifier 360 that is configured to amplify the transmit signal to the desired output power. The power amplifier 360 can be configured with a fixed gain or with a variable gain. The output of the power amplifier 360 is coupled to an RF filter 362 that operates to minimize undesired products that may be generated by the mixer 350 or power amplifier 360. The bandwidth of the RF filter 362 can be fixed or can be variable. In one embodiment, the bandwidth of the RF filter 362 is fixed to a bandwidth that is less than a bandwidth of a transmit operating band. For example, the bandwidth of the RF filter 362 can be fixed to approximately ¼, ⅓, ½, ⅔, ¾ or some other fraction of the bandwidth of the uplink frequency band. In another embodiment, the bandwidth of the RF filter 362 is controlled by the mode controller 390. The filtered output is coupled to the antenna 370 for transmission to a base station or other destination.

The transceiver 300 can be configured with a fixed uplink frequency band and associated bandwidth or a dynamically allocated uplink frequency band and associated bandwidth. In a system supporting a dynamically allocated uplink, the transceiver 300 can receive the uplink resource allocation in a predetermined downlink packet, message, block or channel. For example, a transceiver 300 operating in an IEEE802.16 wireless system receives uplink resource allocation in an Uplink-Map transmitted during a downlink portion of a frame.

In some embodiments, the transceiver 300 is configured to continually operate in a reduced emission mode. In other embodiments, the transceiver 300 can selectively transition to the reduced emission mode from a default operating mode.

In a default operating mode or condition in which the transceiver 300 is not configured for reduced transmit emissions, the transmit path and receiver 380 can time division duplex operation across the same operating frequency band. The transceiver 300 can be allocated uplink resources spanning substantially the entire operating band.

The transceiver 300 can selectively control a transition into a reduced emissions mode. The transceiver 300 can transition modes or operating states based in part on information received in the downlink. For example, the transceiver 300 can transition to the reduced emissions mode based on an indication from the base station. Alternatively, the transceiver 300 can transition to the reduced emission mode based on a desired operating frequency band. For example, the transceiver 300 can operate in a reduced emissions mode any time the operating frequency band is either of the C block or D block WCS bands. In other embodiments, the transceiver 300 can transition to the reduced emissions mode based on some other parameter or combination of parameters.

In one embodiment, the base station allocating uplink resources operates in a predetermined state in those situations where the transceiver 300 is operating in the reduced emissions mode. In one embodiment, an IEEE802.16 OFDMA PHY base station allocating uplink resources operates in AMC mode. The base station restricts the uplink bandwidth to a portion of the available uplink bandwidth. The base station can limit or otherwise restrict the uplink bandwidth by restricting which of the subcarriers to allocate to subscriber stations for uplink transmissions. The number and placement of the subcarriers can vary based on a variety of factors, including the location of the emissions band of interest and the total number of allocatable subcarriers.

The base station can limit the uplink bandwidth to a fraction of the total available operating bandwidth. For example, the base station can limit the uplink bandwidth to approximately ¾, ⅔, ½, ⅓, or ¼ of the full operating bandwidth. In other embodiments, the base station can limit the uplink bandwidth to some other fraction of the operating bandwidth.

The base station can restrict the usable uplink band to the portion of the operating band furthest from the emission band of interest. Thus, where the emissions band of interest is greater than the operating band, such as the case of the DARS band in relation the WCS C block, the base station may limit the uplink band to the portion of the operating band at the lower end of the C block. Conversely, where the emissions band of interest is lower than the operating band, such as the case of the DARS band in relation the WCS D block, the base station may limit the uplink band to the portion of the operating band at the higher end of the D block. Of course, the base station is not limited to any particular offset of the uplink band, and the offset can be fixed or programmable.

The base station may, but is not required, to limit the downlink bandwidth. Thus, the wireless system may operate with asymmetric downlink and uplink bandwidths. The asymmetric bandwidths may be implemented regardless of operating the transmitter and receiver in a TDD fashion across the same operating band.

The transceiver 300 receives uplink resource allocations in the same manner regardless of whether the transceiver 300 is operating in reduced emissions mode or default, standard mode. For example, the receiver 380 receives a UL-MAP in the downlink portion of a frame that allocates uplink resources to the transceiver 300.

However, the transceiver 300 processes the uplink signals differently when in reduced emissions mode. The transceiver 300 can perform a number of functions, either alone or in combination. For example, the mode controller 390 controls the bandwidth of the variable filter 340 to a reduced bandwidth. The mode controller 390 also controls the offset of the frequency of the LO 352 from the frequency used in the standard mode. The mode controller 390 can also control the remapping of the subcarriers to maintain the position of the allocated subcarriers in the operating band in the presence of the LO frequency offset.

Figure 4:
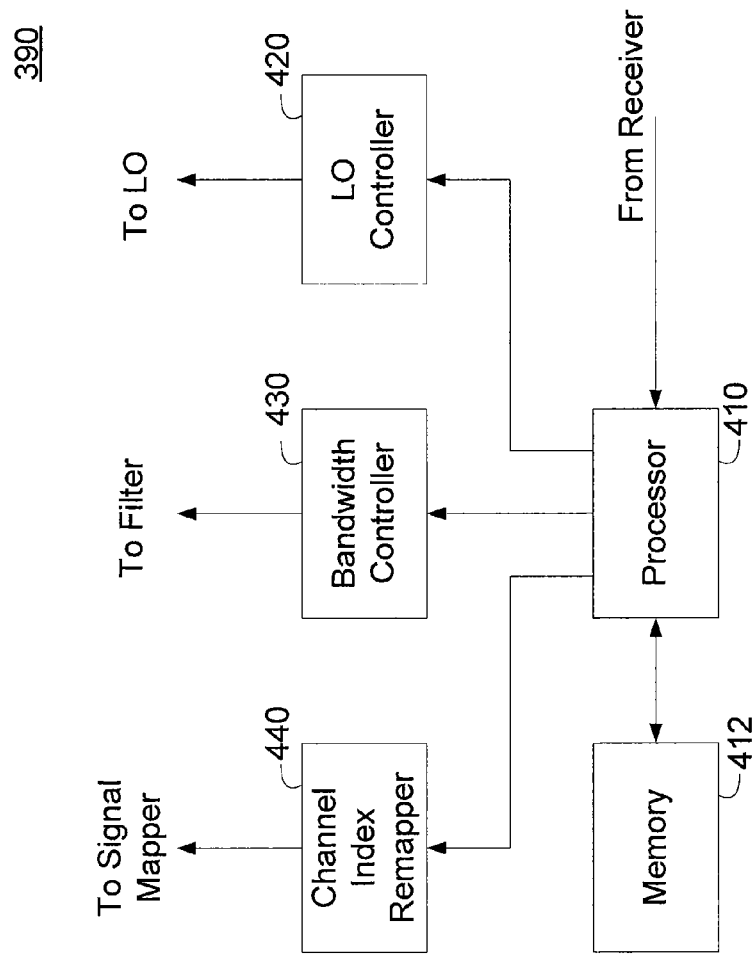
FIG. 4 is a simplified functional block diagram of an embodiment of a mode controller for a transceiver.

FIG. 4 is a simplified functional block diagram of an embodiment of a mode controller 390 for a transceiver. The mode controller 390 can be implemented in the transceiver embodiment of FIG. 3 to control the signal bandwidth, LO frequency offset, and subcarrier remapping.

The mode controller 390 includes a processor 410 coupled to memory 412 or some other processor readable storage media. The processor 410 can operate in conjunction with one or more instructions and data stored in the memory 412 to configure the portions of the mode controller 390 that control each parameter varied when transitioning or operating a transceiver in reduced emissions mode.

The processor 410 is coupled to a plurality of control modules, each of which is configured to control one parameter that is varied during the transition or operation of the transceiver in reduced emissions mode. The processor 410 is coupled to an LO controller 420, a bandwidth controller 430, and a channel index remapper 440. Although each of the modules is depicted as a distinct module, other embodiments may integrate some or all of the functions of one or more of the modules in another module. Other embodiments may eliminate some of the control modules.

The processor 410 is configured to receive the uplink resource allocation from a receiver (not shown). The processor 410 can determine from the uplink resource allocation or from some other information, the desire to transition to a reduced emissions mode. In some embodiments, the transceiver may always operate in reduced emissions mode, in which the processor 410 need not determine a need to transition to the reduced emissions mode. The processor 410 configures the various control modules to provide uplink signals over the allocated uplink resources.

The LO controller 420 is configured to offset the center frequency of transmit signal relative to an operating band center frequency. In embodiments in which the transceiver utilizes a shared LO for a TDD transmitter and receiver, the LO controller 420 can offset the LO frequency during the transition from the receive mode to the transmit mode, and can return the frequency to the original setting when transitioning back to receive mode. Offsetting the LO frequency in the reduced emissions mode can permit the use of a narrower signal bandwidth.

The LO controller 420 can be, for example, a frequency synthesizer that controls an output frequency of a Voltage Controlled Oscillator (VCO). The LO controller 420 can receive from the processor 410 a desired frequency information or a control signal indicative of a desired frequency and can control the output frequency of a LO based on the information or control signal. In other embodiments, the LO controller 420 can be a Numerically Controlled Oscillator (NCO) or clock generator for an NCO, and the output signal or clock rate can be varied by the processor to control the output frequency of a LO. The LO controller 420 can have other implementations in other embodiments, depending on the manner in which the LO signal is generated.

The direction of the frequency offset is determined at least in part on the position of the emissions band of interest relative to the operating frequency band. Typically, the LO controller 420 operates to offset the LO frequency, and thus a center frequency of the transmit signal, in a direction that positions the transmit signal further away from the emission band of interest. The position of the emission band of interest may be known by the processor 410 by accessing relevant information in the memory 412. In other embodiments, the location of the emissions band of interest may be received in a control message from the receiver.

The magnitude of the frequency offset introduced by the LO controller 420 can be fixed or dynamically determined. In the situation where the magnitude is fixed, the magnitude can be predetermined to be a frequency offset that places the edge of the transmit signal having the maximum allocatable bandwidth at the edge of the operating band. Recall that the transmit signal has a bandwidth that is less than the full operational bandwidth, and may be, for example, one-half of the available bandwidth.

In the situation where the magnitude of the frequency offset introduced by the LO controller 420 is dynamic and selectable, the magnitude can be determined based in part on the uplink resource allocation. In one embodiment, the LO controller 420 can be configured to maximize the magnitude of the frequency offset. In such an embodiment, the LO controller 420 controls the magnitude of the offset to place the edge of the transmit signal at the edge of the operating band. The LO controller 420 increases the magnitude of the frequency offset as the bandwidth allocated for transmit signals decreases. Conversely, the LO controller 420 decreases the magnitude of the frequency offset as the bandwidth allocated for the transmit signal increases. The LO controller 420 can be configured to implement the frequency offset in fixed increments, and the increments can correspond to an OFDM subcarrier spacing.

In another embodiment, the LO controller 420 can be configured to control the frequency offset to the maximum frequency offset that can be introduced while maintaining a position of the transmit signal in the operating band to the frequencies specified in the uplink resource allocation messages. For example, the uplink resource allocation may allocate specific uplink frequencies for the transmit signal. The LO controller 420 introduces a frequency offset of a magnitude that maximizes the offset while maintaining the frequencies of the transmit signal, when channel remapping is performed.

The bandwidth controller 430 can reduce the bandwidth of the transmit signal relative to a standard or default bandwidth when the transceiver operates in reduced emissions mode. The bandwidth controller 430 can reduce the bandwidth of a baseband filter, IF filter, RF filter, or some combination thereof.

The bandwidth controller 430 can vary the component values of an analog filter, the tap values or tap lengths of a digital filter, or perform some other parameter control that is related to bandwidth control. In one embodiment, the bandwidth controller 430 is configured to vary the values of one or more varactors in an analog filter.

The bandwidth controller 430 can reduce the bandwidth of a filter by a fixed amount or a variable amount. For example, the bandwidth controller 430 can reduce the bandwidth of a baseband low pass filter to a bandwidth that is based on a maximum transmit bandwidth in the reduced emissions mode. For example, where the transmit signal in reduced emissions mode is a maximum of one-half the operational band, the bandwidth controller 430 can be configured to reduce the passband of a baseband low pass filter to approximately one-half the operational bandwidth.

In a situation where the bandwidth is controlled dynamically when in the reduced emissions mode, the bandwidth controller 430 can be configured to reduce the bandwidth of a baseband low pass filter to the bandwidth of the signal allocated by the base station in the uplink resource allocation messages. In such an embodiment, the bandwidth controller 430 can adjust the bandwidth at a rate that coincides with the rate of the uplink resource allocations, such as every frame.

The bandwidth controller 430 reduces the signal bandwidth in the reduced emissions mode to a bandwidth that is less than the signal bandwidth needed to pass a transmit signal occupying substantially the full operating band. Thus, the transmit signal bandwidth in the reduced emissions mode is typically less than the bandwidth of a transceiver operating in a standard non-reduced emissions mode.

The reduced bandwidth results in reduced out of band emissions. For example, a reduced bandwidth in an analog baseband filter following the ADC reduces the undesired products output by the ADC, including out of band ADC noise. In another example, a reduced RF bandwidth in an analog RF output filter can reduce the level of out of band emissions, and particularly, the level of any out of band higher order distortion products generated in the final power amplifier stage.

The channel index remapper 440 operates to remap the indices of the allocated uplink subcarriers to compensate for the LO frequency offset. By remapping the indices of the allocated subcarriers, the transmitter can maintain the position of the allocated subcarriers in the presence of LO offset.

For example, the base station can allocate uplink subcarriers by referencing an index that identifies the subcarrier in a particular OFDM symbol format. The channel index remapper 440 can receive the indices of the allocated subcarriers from the processor 410 and can remap the subcarrier indices to compensate for the LO offset. The channel index remapper 440 supplies the remapped channel indices to a signal mapper used in the DFT portion of the transmitter, and the signal mapper need not have any knowledge of the remapping operation. This remapping function is described in more detail below with respect to FIGS. 6A through 6D.

The various emission reduction techniques, particularly the LO offset, does not affect the ability of the transceiver to maintain full compliance with an operating standard, such as the IEEE802.16 Wireless MAN OFDMA PHY operating standard, when operating in the reduced emissions mode. The base station need not have any knowledge of the emission reduction techniques implemented by the transceiver in the subscriber station. Instead, the base station need only operate in a predetermined operating mode, such as AMC in IEEE802.16 OFDMA PHY.

FIGS. 5A-5H are simplified spectral diagrams of embodiments of a transmit spectrum under various emission reduction conditions. Each of FIGS. 5A-5H illustrates a combination of frequency offset, bandwidth reduction, and subcarrier remapping to reduce emissions in a particular emissions band of interest. As can be seen from the figures, the transmitter can reduce out of band emissions using virtually any combination or subcombination of frequency offset, bandwidth reduction, and subcarrier remapping.

FIGS. 5A-5H all illustrate bandwidth reduction. FIGS. 5A and 5D-5H illustrate bandwidth reduction in combination with frequency offset. The embodiments of FIGS. 5A and 5D-5H may optionally include subcarrier remapping in conjunction with the frequency offset.

Figure 5B:
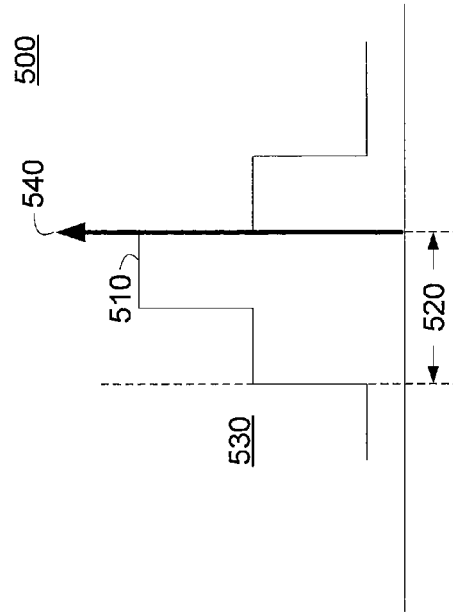
Figure 5D:
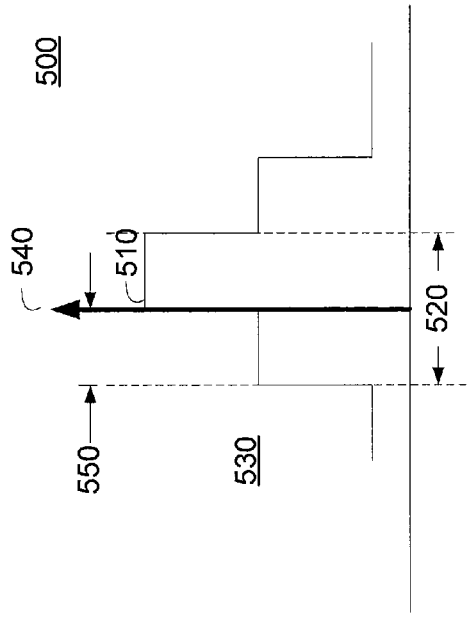
Figure 5A:
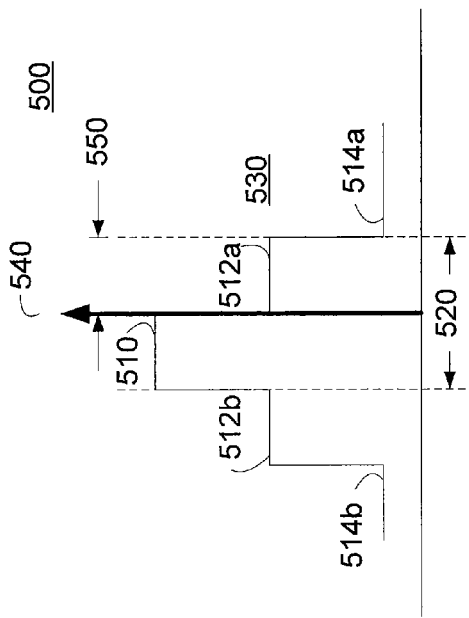
Figure 5C:
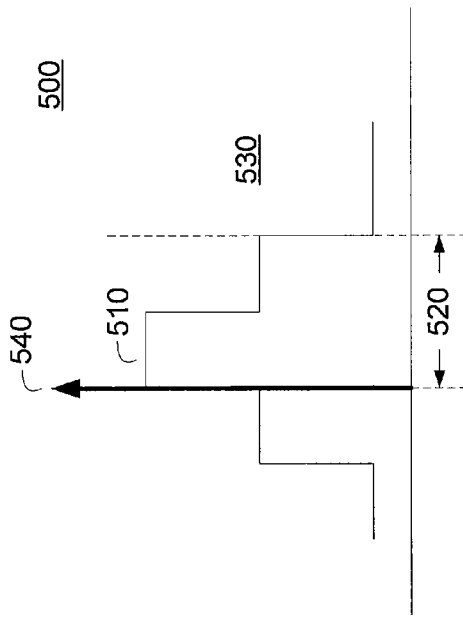

FIGS. 5A and 5B illustrate Single Side Band (SSB) upconversion of a baseband signal using a high side LO. FIGS. 5C and 5D illustrate SSB upconversion of the baseband signal using low side LO. FIGS. 5E and 5F illustrate direct conversion, also referred to as direct modulation of an LO. FIGS. 5A, 5C and 5E illustrate a condition in which the emissions band of interest is above the operating band, and FIGS. 5B, 5D, and 5F illustrate a condition in which the emissions band of interest is below the operating band.

FIG. 5A illustrates a transmit spectrum 500 of a transmit signal 510 converted to a portion of an operating frequency band 520 that is adjacent to an emissions band of interest 530. In FIG. 5A, the bandwidth of the transmit signal 510 is squished or otherwise reduced to less than the bandwidth of the operating frequency band 520. Additionally, the LO 540 is hopped or otherwise frequency offset relative to a transmit signal occupying the entire operating frequency band 520. In FIG. 5A, a baseband signal is upconverted to the portion of the operating frequency band 520 using a high side LO 540. An emissions band of interest 530 is shown adjacent and above the operating frequency band 520.

The upconverted transmit signal 510 is illustrated as having pedestals, 512a-b and 514a-b, to illustrate possible levels of higher order distortion. The higher order distortion can be, for example, third order distortion 512a-b or fifth order distortion 514a-b. The distortion may be due to, for example, nonlinearities in an amplifier stage. Offsetting the frequency of the LO 540 away from the restricted emissions band 530 reduces the level of intermodulation products and LO feedthrough phase noise that falls within the emissions band of interest 530.

The simplified spectrum diagram illustrates SSB upconversion. The potential image is not shown in any of the figures, but occurs at the complement to the SSB frequencies. A SSB conversion has an image that is substantially a reduced version of the transmit signal 510 mirrored about the LO 540 frequency.

In FIG. 5A, the LO 540 is shown as frequency offset 550 by approximately one-half the operating frequency band 520 bandwidth and in the direction away from the emissions band of interest 530. This magnitude of frequency offset 550 can be used where the transmit signal 510 occupies a maximum of approximately one-half the operating frequency band 520. With this magnitude of frequency offset 550, substantially all of the upper third order distortion products 512a are contained within the operating frequency band 520. Additionally, the main portion of the image (not shown) would be within the operating frequency band 520. The frequency span of the image substantially coincides with the span of the upper third order distortion products 512a. The bandwidth of the transmit signal 510 is illustrated in FIGS. 5A-5H as occupying substantially one-half the operating frequency band 520. However, the bandwidth of the transmit signal 510 is not limited to any particular bandwidth and may be reduced to less than one-half the operating frequency band 520 if a transition band is desired between the third order products and the emissions band of interest 530. The bandwidth reduction may be augmented with a greater frequency offset 550, such that the lowest portion of the transmit signal 510 is positioned at the lower band edge of the operating frequency band 520.

In FIG. 5B, the transmit signal 510 is SSB upconverted to the upper portion of the operating frequency band 520 by a high side LO 540. However, the emissions band of interest 530 lies below the operating frequency band 520. In this embodiment, the transmit band 510 is reduced to approximately one-half the operating frequency bandwidth 520, but the LO 540 does not need to be offset. Thus, in some embodiments, the bandwidth reduction of the transmit band 510 is in itself sufficient to reduce transmit emissions.

In FIG. 5C, the transmit signal 510 is SSB upconverted to the lower portion of the operating frequency band 520 using a low side LO 540. The emissions band of interest 530 lies above the operating frequency band 520. In this embodiment, the transmit band 510 is reduced to approximately one-half the operating frequency bandwidth 520, but the LO 540 does not need to be offset.

In FIG. 5D, the transmit signal 510 is SSB upconverted to the upper portion of the operating frequency band 520 using a low side LO 540. The emissions band of interest 530 lies below the operating frequency band 520. The transmit band 510 is reduced to approximately one-half the operating frequency bandwidth 520, and the LO 540 is frequency offset 550 away from the lower band edge to position the transmit signal 510 at the upper portion of the operating frequency band 520, while allowing a minimum baseband signal bandwidth.

In FIG. 5E, the transmit signal 510 is direct upconverted to the lower portion of the operating frequency band 520, using a LO 540 having a frequency at substantially the center of the bandwidth of the upconverted transmit signal 510. For example, the transmit signal 510 can be directly modulated to the LO 540. The LO 540 can be offset from substantially a center of the operating frequency band 520 to substantially a center of the transmit signal 510. The LO 540 can be offset by approximately one-quarter the bandwidth of the operating frequency band 520 where the transmit signal 510 is configured to occupy up to approximately one-half the operating frequency band 520. The LO 540 is offset away from the emissions band of interest 530. In the example of FIG. 5E, the emissions band of interest 530 lies above the operating frequency band. Therefore, the LO 540 is offset down in frequency.

In FIG. 5F, the transmit signal 510 is direct upconverted to the upper portion of the operating frequency band 520, using a LO 540 having a frequency at substantially the center of the bandwidth of the upconverted transmit signal 510. In FIG. 5F, the emissions band of interest 530 is below the operating frequency band 520. The LO 540 is offset by a magnitude that positions the center frequency of the transmit signal 510 at the desired frequency. For example, for a transmit signal 510 having a bandwidth of approximately on-half the bandwidth of the operating frequency band 520, the magnitude of the LO 540 offset is approximately one-fourth the bandwidth of the operating frequency band 520. The LO 540 is offset up in frequency to offset the center frequency of the transmit signal 510 away from the emissions band of interest 530.

Although FIGS. 5E and 5F illustrate direct conversion with a shifted LO at approximately the center of the upconverted transmit signal 510, the shifted LO frequency is not limited to approximately the center of the upconverted transmit signal 510. FIGS. 5G and 5H illustrate signals spectrum in which the transmit signal 510 is direct converted using a LO 540 that is purposely offset from approximately the center frequency of the transmit signal 510. In FIGS. 5G and 5H, the LO frequency offset 550 overshoots or overhops the LO offset that is used if the LO were positioned in the center of the transmit signal 510. The term overshoot or overhop refers to having a magnitude of a LO frequency offset 550 greater than an offset that positions the LO frequency in the center of the transmit signal 510.

FIG. 5G illustrates a spectrum for direct upconversion where the transmit signal 510 is direct upconverted to the lower portion of the operating frequency band 520, using a LO 540 having a frequency offset from the center of the bandwidth of the upconverted transmit signal 510. In particular, the LO frequency offset 550 is greater than the offset for the embodiment in which the LO frequency 540 is positioned substantially at the center of the transmit signal 510. The spectrum of the transmit signal 510 is overpopulated in the direction of the emissions band of interest 530. Stated differently, the LO frequency offset 550 overshoots the frequency offset used to center the LO 540 in the transmit signal 510.

The amount of the frequency overshoot, or overhop, can be determined based in part on the bandwidth of a lowpass filter used to reduce the baseband signal bandwidth to less than the bandwidth of the operating frequency band 520. In general, the signal bandwidth of the direct converted transmit signal is limited to twice the bandwidth of the baseband lowpass filter. The signal bandwidth is generally centered about the LO 540.

Overhooting or overhopping the LO 540 results in a portion of one sideband of the transmit signal 510 being placed substantially nearer to, or extending beyond, a corner frequency of the baseband lowpass filter. In the spectrum of FIG. 5G, the highest subcarrier of the transmit signal 510 is closer to a bandedge defined by the baseband lowpass filter compared to the spectrum of FIG. 5E. Conversely, the lowest subcarrier of the transmit signal 510 in FIG. 5G lies further within the bandwidth defined by the baseband lowpass filter compared to the spectrum of FIG. 5E.

FIG. 5H illustrates a spectrum for direct upconversion where the transmit signal 510 is direct upconverted to the upper portion of the operating frequency band 520. In the spectrum of FIG. 5H, the LO 540 is overhopped to a frequency that is greater than a center frequency of the transmit signal 510.

In the embodiment illustrated by the spectrum of FIG. 5H, the overshoot or overhop of the LO 540 frequency results in the lowest subcarrier within the transmit signal 510 being positioned much closer to the bandedge defined by the baseband lowpass filter. The effect of overhopping the LO frequency 540 in the embodiments of FIGS. 5G and 5H is to position a bandedge of the transmit signal 510 closer to a bandwidth defined by a baseband lowpass filter. The direction and magnitude of the overhop can be determined, in part, based on the location of the emissions band of interest 530 and the bandwidth of the baseband filter. Additionally, the magnitude of the overhop can be controlled such that the LO frequency 540 is not coincident with a subcarrier that is scheduled to carry transmit data. In this manner, nulling of the subcarrier that is coincident with the overhopped LO frequency 540 does not result in any loss of data.

The simplified spectrum diagrams of FIGS. 5A-5H illustrate how a particular implementation can affect the selection of emissions reduction techniques. For example, some implementations can utilize bandwidth reduction without a LO frequency offset. Other embodiments can utilize LO frequency offset without bandwidth reduction. Embodiments that include LO frequency offset can selectively incorporate or omit subchannel remapping, depending on the ability of other portions of the communication system to compensate for the LO frequency offset. Of course, some systems can implement some combination of emissions reduction techniques, such as bandwidth reduction in combination with LO frequency offset and subchannel remapping, or some other combination.

Figure 6C:
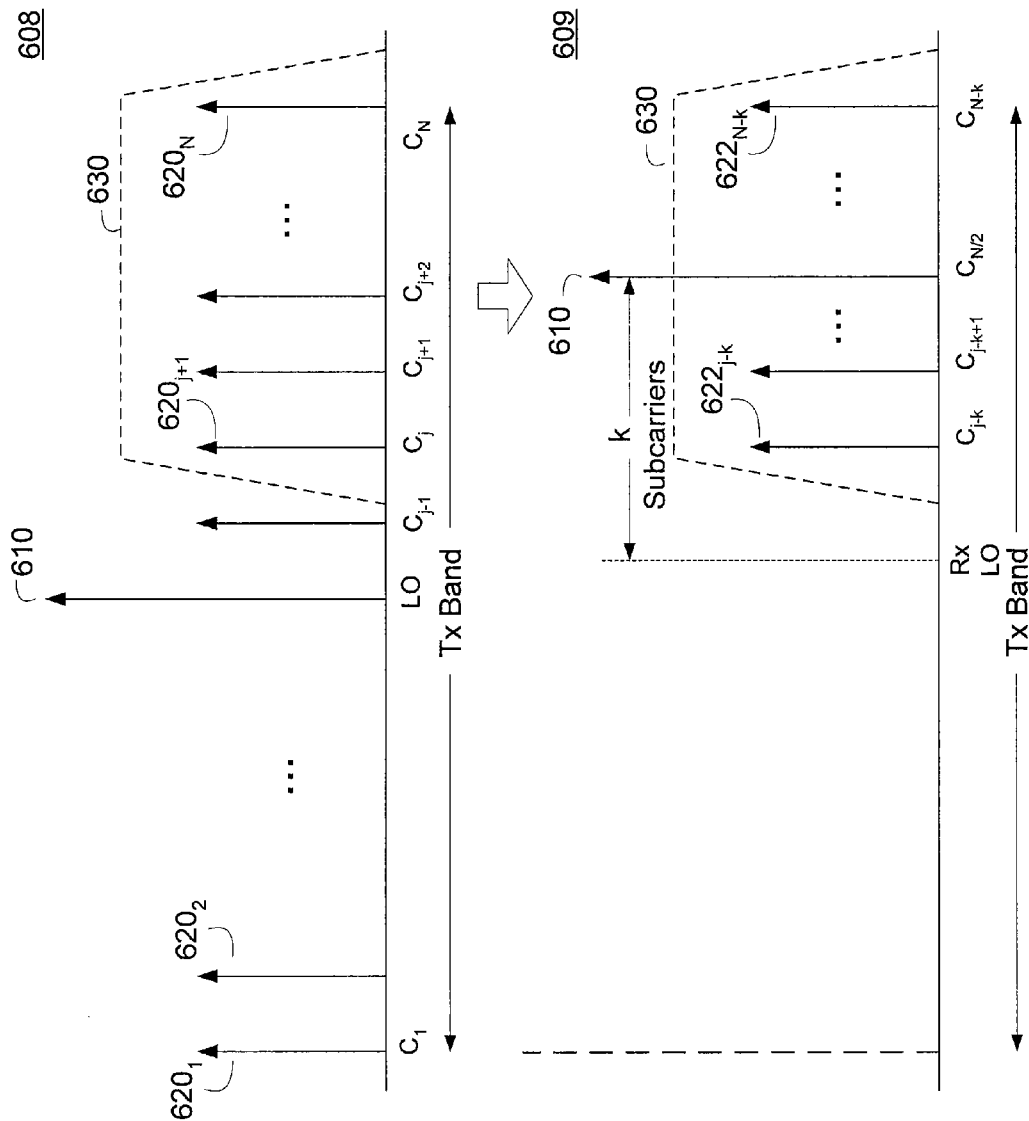

FIGS. 6A-6D are simplified spectrum diagrams illustrating channel index remapping. FIG. 6A are spectrum diagrams 600 and 602 illustrating subcarrier remapping corresponding to a high side LO that is offset downward in frequency by an amount substantially equal to K times the subcarrier spacing.

The upper spectrum diagram 600 illustrates the standard operating condition without any emissions reduction. A high side LO 610 upconverts a plurality of subcarriers 620$_1$-620$_N$ to the operating band. The spectrum diagram 600 illustrates a spectral inversion of the baseband order of the subcarriers, such as would occur in a single conversion transmitter. However, high side conversion does not necessarily result in final output that is spectrally inverted, particularly in systems implementing multiple frequency conversions.

The spectrum diagram 600 illustrates a standard condition in which a subscriber station can be allocated any of the subcarriers 620$_1$-620$_N$ for uplink transmissions. A reduced operating band 630 illustrates the portion of the operating band that is used during reduced emissions mode. During reduced emissions mode, the base station allocates only subcarriers 620$_{j+1}$-620$_N$ within the reduced operating band 630.

The lower spectrum diagram 602 illustrates the subcarrier remapping that occurs to compensate for an offset LO 610. In the embodiment illustrated in the spectrum diagram 602, the LO 610 is shifted down in frequency by an amount substantially equal to K subcarriers.

The subcarriers 620$_{j+1}$-620$_N$ within the reduced operating band 630 are remapped to subcarriers 622$_{j+1-K}$-622$_{N-K}$ within the same reduced operating band 630. The frequency of the reduced operating band 630 remains constant, but the indices of the subcarriers 622$_{j+1-K}$-622$_{N-K}$ are remapped such that the offset LO 610 upconverts the subcarriers to the reduced operating band 630. As can be seen from the spectrum diagrams 600 and 602, the subcarrier index remapping requires an offset in the index equal to the LO offset, in number of subcarriers.

FIG. 6B are spectrum diagrams 604 and 606 illustrating subcarrier remapping corresponding to a low side LO 610 that is offset upward in frequency by an amount substantially equal to K times the subcarrier spacing. The upper spectrum diagram 604 illustrates the subcarriers 620$_1$-620$_N$ within the operating band, and a subset of subcarriers 620$_{j+1}$-620$_N$ within the reduced operating band 630 that is used during reduced emissions mode.

The lower spectrum diagram 606 illustrates the spectrum in reduced emissions mode, with the LO 610 offset by substantially K subcarriers. The subcarriers 620$_{j+1}$-620$_N$ within the reduced operating band 630 of the standard spectrum diagram 604 are remapped to subcarriers 622$_{j+1-K}$-622$_{N-K}$ in the spectrum 606 of the reduced operating band 630 when the transmitter is in reduced emissions mode. The subcarrier index mapping results in each mapped index being reduced by the subcarrier offset, K.

FIG. 6C are spectrum diagrams 608 and 609 illustrating subcarrier remapping corresponding to direct upconversion such as, for example, a LO 610 directly modulated with the transmit signal. The upper spectrum diagram 608 illustrates the subcarriers 620$_1$-620$_N$ within the operating band, and a subset of subcarriers 620$_{j-K}$-620$_{N-K}$ within the reduced operating band 630 that is used during reduced emissions mode. In the upper spectrum diagram 608, the LO 610 is positioned substantially in the center of the operating band.

The lower spectrum diagram 609 illustrates the spectrum in reduced emissions mode. The LO 610 is offset to be positioned substantially in the center of the reduced operating band 630.

The spectrum diagrams 608 and 609 illustrate the position of the LO 610 within the transmit band for ease of description. For example, the upper spectrum diagram 608 illustrates the LO 610 at substantially the center of the transmit band, while the lower spectrum diagram 609 illustrates the LO 610 at substantially the center of the reduced operating band 630. In either case, the DC null module operates to null or substantially reduce the emissions at the LO 610. Therefore, the actual transmitted signal typically excludes signal component at the frequency of the LO 610.

The subcarriers 620$_j$-620$_N$ within the reduced operating band 630 of the standard spectrum diagram 604 are remapped to subcarriers 622$_{j-K}$-622$_{N-K}$ in the spectrum 609 of the reduced operating band 630 when the transmitter is in reduced emissions mode. The subcarrier index mapping results in each mapped index being reduced by the subcarrier offset, K.

The subcarrier index remapping is not solely based on the LO frequency offset. The subcarrier index remapping can be determined based on a combination of the LO frequency offset and the bandwidth of the reduced operating band 630.

Figure 6D:
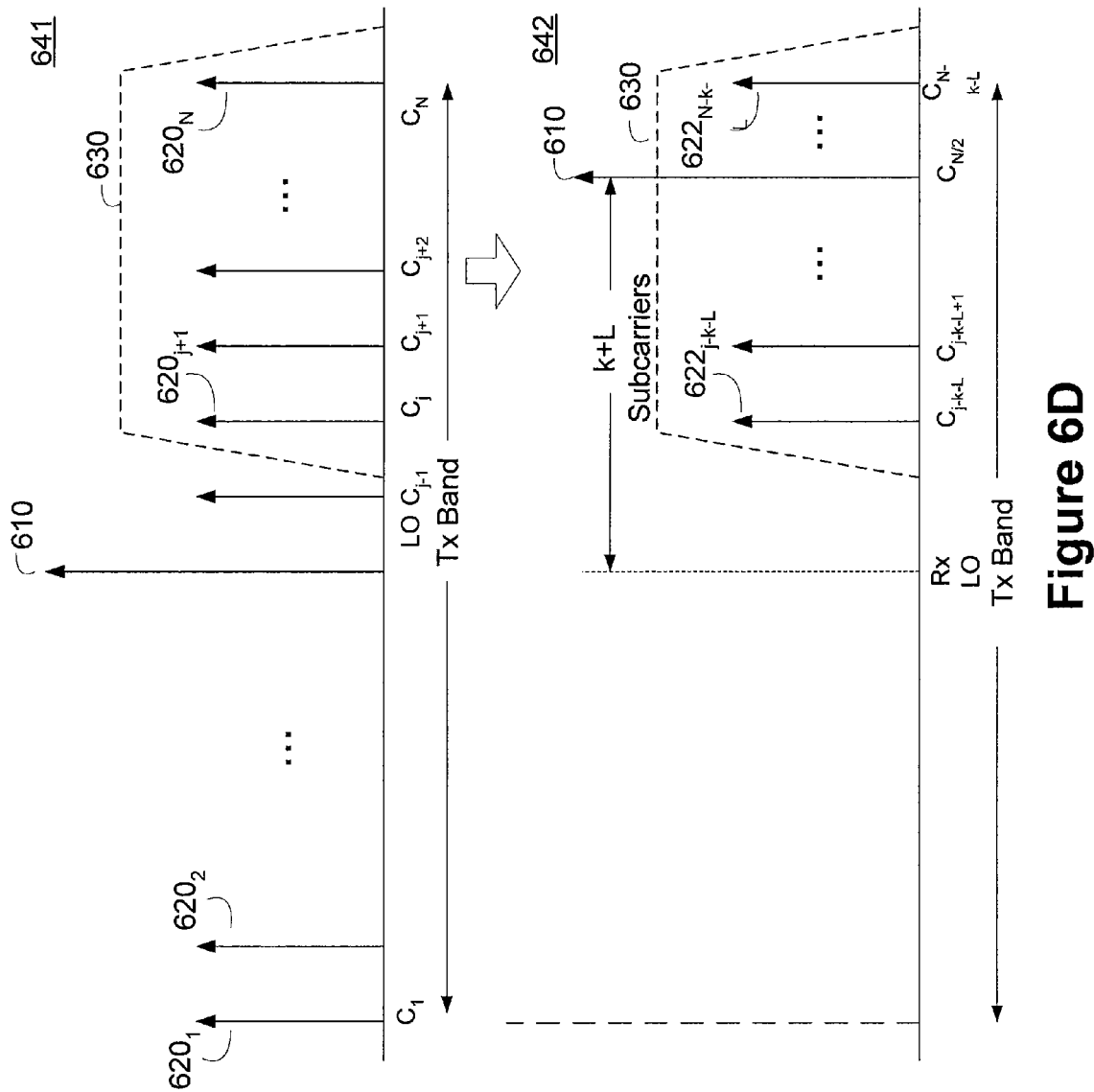

FIG. 6D are spectrum diagrams 641 and 642 illustrating an embodiment of subcarrier remapping implementing an LO overhop. In FIG. 6D, the upper spectrum diagram 641 illustrates the subcarriers 620$_1$-620$_N$ within the operating band, and a subset of subcarriers 620$_{j-k}$-620$_{N-k}$ within the reduced operating band 630 that is used during reduced emissions mode. In the upper spectrum diagram 641, the LO 610 is positioned substantially in the center of the operating band.

Figure 7:
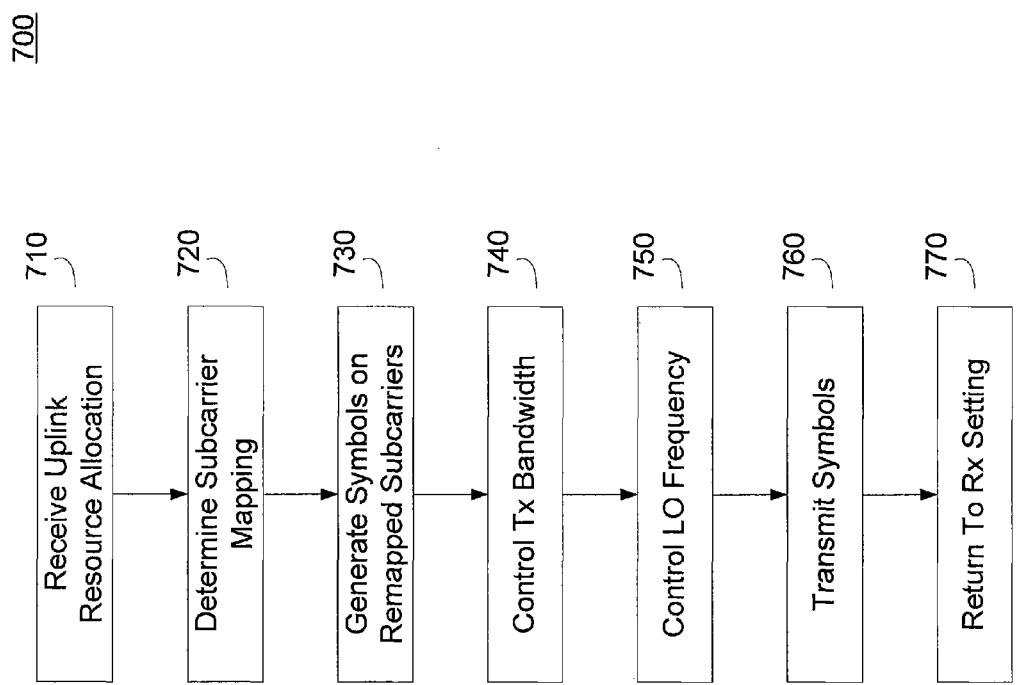
FIG. 7 is a simplified flowchart of an embodiment of a process of reducing transmit emissions.

FIG. 7 is a method 700 of reducing out of band emissions. The method 700 can be performed, for example, by the transceiver of FIG. 3 or the base station or subscriber station of FIG. 1.

The method 700 is described in the context of a subscriber station operating in a wireless system in which uplink resources are allocated to the subscriber station, such as an IEEE802.11 OFDMA PHY. The subscriber station executing the method 700 is configured to operate in reduced emissions mode. However, the method 700 represents an embodiment of reducing emissions. The method 700 and steps of the method are not considered to be limitations on other implementations supporting other wireless systems.

The method 700 begins at block 710, where the subscriber station receives an uplink resource allocation. The subscriber station can, for example, receive an uplink resource allocation in an UL-MAP message from a base station in an IEEE802.16 OFDMA PHY compliant system. The base station can be configured to allocate uplink resources in only a portion of the uplink operating band. The base station can comply with this constraint while operating within the standard by operating in AMC mode, and limiting uplink resources to a predetermined number of bins.

After receiving the uplink resource allocation, the subscriber station proceeds to block 720 and determines the subcarrier map from the uplink resource allocation. For example, the subscriber station can receive a resource allocation message that allocates uplink resources by referencing an index of each of the allocated subcarriers.

The subscriber station proceeds to block 730 and also performs subcarrier remapping, if necessary, to compensate for any frequency offset that is introduced during the frequency conversion process. In one embodiment, the transmit LO frequency is offset from a standard mode LO frequency by a fixed amount that is substantially an integer multiple of a subcarrier spacing. The subscriber station performs subcarrier remapping by either adding or subtracting an index offset to the subcarrier indices identified in the uplink resource allocation.

The subscriber station also generates OFDM symbols based on the remapped subcarriers. Thus, the uplink information is modulated on the remapped subcarriers determined based on a remapping algorithm and the indices of the subcarriers allocated in the uplink resource allocation.

The subscriber station proceeds to block 740 and controls the transmit bandwidth to a reduced bandwidth. The bandwidth in the reduced emissions mode is less than the operating bandwidth used in a standard mode. As an example, the subscriber station can reduce the bandwidth of an analog filter implemented after a DAC stage. The analog filter can be a baseband filter. The subscriber station can reduce the passband of the filter to a bandwidth that is configured to pass the reduced transmit bandwidth implemented in reduced emissions mode. The bandwidth in reduced emissions mode can be, for example, ½, ⅓, ¼, or some other fraction of the standard operating bandwidth.

The subscriber station proceeds to block 750 and controls the LO frequency to introduce the frequency offset. In one embodiment, the subscriber station operates a transmitter and receiver in TDD fashion over the same operating bandwidth. The subscriber station can utilize the same LO for both the transmitter and receiver frequency conversion operations. However, the center frequency of the transmit signal is offset from the center frequency of the operating band by offsetting the LO frequency. Thus, the subscriber station repositions, retunes, frequency hops, or otherwise controls the LO frequency to a frequency offset from the frequency used by the receiver.

The subscriber station proceeds to block 760 and transmits the OFDM symbols across the allocated uplink resources. The subcarrier remapping and the LO offset combine to produce a transmit signal that occupies the same portion of the operating band authorized in the uplink resource allocation.

The subscriber station proceeds to block 770 and returns the settings to the standard settings for processing the information in the receive portion of the TDD operation. The subscriber station can, for example reset the bandwidth of the filter, particularly if the transmit and receive paths share the same filter. Alternatively, if the transmit filter is dedicated to the transmit path, the subscriber station may maintain the reduced bandwidth so long as the subscriber station remains in reduced emissions mode. The subscriber station restores the LO frequency to the frequency used by the receiver. The subscriber station is then prepared to receive information.

The uplink out of band emissions can be effectively controlled by limiting the bandwidth allocations to a portion of the full operating frequency band in combination with bandwidth reduction, LO frequency offsetting, and subcarrier remapping. The uplink emissions reductions can be implemented entirely within a subscriber station if the base station is limited to allocating channels within the desired portion of the full operating frequency band.

However, limiting uplink allocations to only a portion of the full operating bandwidth results in an underutilization of available resources. In particular, a wireless communication system can support communications across the entire operating bandwidth, provided the base station and subscriber stations implement some constraints on uplink transmit power. The uplink transmit power constraints may be implemented within the base station, subscriber station, or a combination of the base station and subscriber station. Furthermore, the uplink transmit power constraints can be implemented independently or in combination with one or more of the bandwidth reduction, LO offsetting, and subcarrier remapping techniques described above.

Uplink transmit power constraints can be implemented by recognizing the power control structure implemented in many wireless communication systems. In many wireless communication systems, each subscriber station implements a closed power control loop in conjunction with the serving base station in order to control its transmit power to ensure a sufficient link quality without unnecessarily introducing interference for other subscriber stations. In a typical closed power control loop, a subscriber station measures a downlink transmit power from the serving base station and reports a metric back to the base station. The base station can estimate, based on the metric, an initial uplink transmit power level to be implemented by the subscriber station during an uplink allocation.

The base station instructs subscriber stations with a poorer channel to increase their transmit power and instructs subscriber stations having good channels to decrease their transmit power. In general, the transmit power of a subscriber station increases as its distance from the serving base station increases.

A serving base station can utilize its knowledge of an expected subscriber station uplink transmit power in allocating uplink resources. Alternatively, a subscriber station can utilize its knowledge of received signal strength from the serving base station and an expected transmit power to constrain its maximum transmit power.

Figure 8:
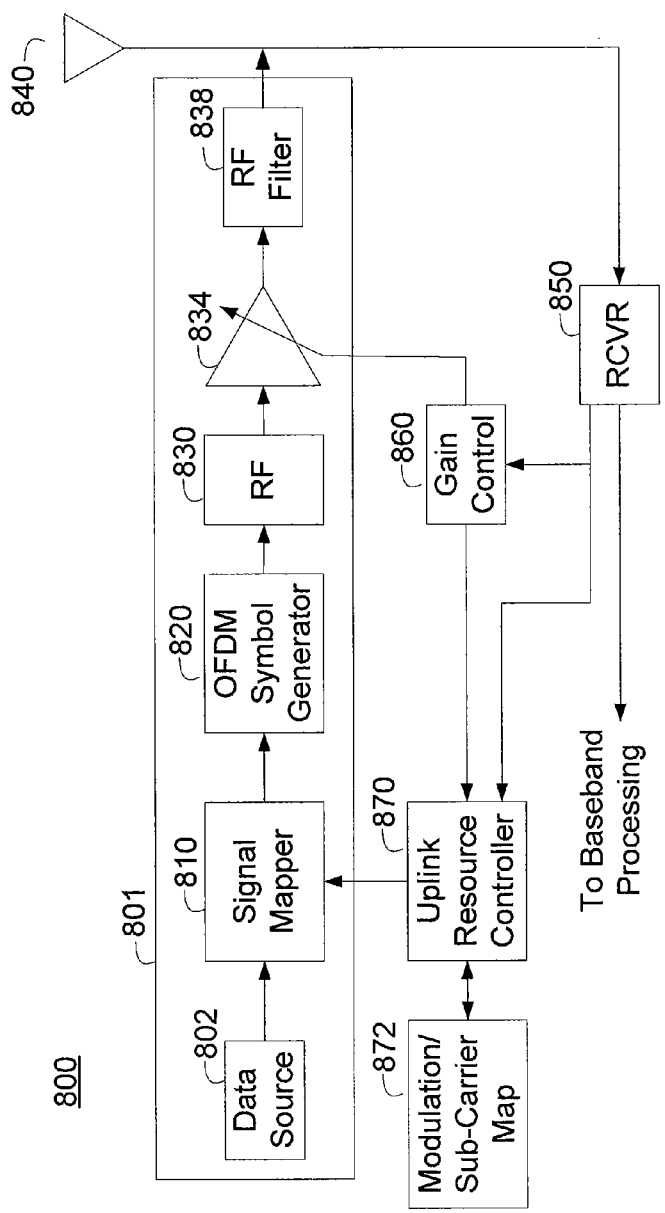
FIG. 8 is a simplified functional block diagram of an embodiment of a transceiver.

FIG. 8 is a simplified functional block diagram of an embodiment of a base station 800 implementing uplink transmit power constrained resource allocation. The base station 800 can be, for example, a base station of the wireless communication system of FIG. 1.

The base station 800 includes a data source 802 that supplies the data or signals for one or more communication links the base station 800 has established with one or more subscriber stations. The data source 802 couples the signals to a signal mapper 810 that is configured, for example, to map the signals to the subcarriers of an OFDM symbol that are associated with the various downlink channels supported by the base station 800.

The signal mapper 810 couples the subcarrier information to an OFDM symbol generator 820 where an OFDM symbol is constructed from the information on the subcarriers. The OFDM symbol generator 820 couples the OFDM symbol to a RF module 830 that operates to process and frequency translate the OFDM symbol to a desired downlink RF frequency.

The output of the RF module 830 is coupled to an RF amplifier 834. The RF amplifier 834 can include one or more amplifier stages and the gain of the RF amplifier 834 can be variable. The output of the RF amplifier 834 is coupled to an RF filter 838 which couples the filtered downlink signal to an antenna 840 for broadcast across the coverage area.

The base station 800 can be configured to support TDD operation, and the RF portion of the transmit signal path can be configured to operate at a distinct time from the receive path. The antenna 840 can also be used to receive the uplink transmissions from the various subscriber stations in the coverage area. The uplink transmissions during the uplink time portion are coupled to a receiver 850 for processing to a baseband receive signal.

The received uplink signals, or a portion thereof, are coupled from the receiver 850 to a gain control module 860 for additional processing. For example, the receiver 850 can be configured to extract communications from one or more overhead channels and couple the overhead messages to the gain control module 860 for further processing. The receiver 850 can extract uplink resource requests from one or more overhead channels and couple the uplink resource requests to an uplink resource controller 870. The receiver 850 can be configured to couple information, such as traffic information, to other modules (not shown) for additional baseband processing.

The received uplink signals can include one or more power control metrics from each of the subscriber stations in the coverage area. Each subscriber station can provide the power control metrics periodically, in response to a query, in response to an occurrence of a triggering event, and the like, or some combination thereof.

The power control metrics can include, for example, a measure of received power or a received signal strength indication (RSSI). The RSSI value or other power control metric can be indicative of the downlink signal power received or detected by each subscriber station. In one embodiment, the base station 800 can be configured to transmit a constant transmit power or a constant transmit power density across the transmit band. Where the base station 800 is configured to transmit with a constant transmit power density, the power density can be measured in terms of power per OFDM subcarrier. In other embodiments, the power density can be measured across some other bandwidth, such as a signal bandwidth of an OFDM symbol, or a bandwidth encompassing several OFDM subcarriers. In other embodiments, the base station 800 transmits pilot signals at known powers or power densities. The subscriber station may have knowledge of the pilot power or power densities, and/or the base station may use the known pilot densities when analyzing the RSSI feedback message.

The downlink channel is typically correlated with the uplink channel in a TDD system. Thus, the base station 800 can determine from the power control metric the initial subscriber station transmit power that is needed to support a given signal quality.

The gain control module 860 can determine a gain adjustment to apply to the RF amplifier 834, where the gain adjustment can vary, for example, the gain applied to at least a portion of the downlink signal. The gain control module 860 can also couple a control message or signals to the uplink resource controller 870.

The uplink resource controller 870 receives the uplink resource requests corresponding to one or more subscriber stations in the supported coverage area. The uplink resource controller 870 also receives the power control metric or some other control message or indication related to the power control metric from the gain control module 860.

The uplink resource controller 870 services the uplink resource requests by allocating and scheduling the uplink resources corresponding to the requests. The uplink resource controller 870 can be configured, for example to generate the uplink resource allocations in one or more control messages broadcast to the subscriber stations in the coverage area. For example, in a wireless communication system supporting IEEE802.16 WirelessMAN OFDMA PHY, the uplink resource controller 870 can be configured to generate an Uplink Map (UL-MAP) that is broadcast as part of the downlink signals.

The base station 800 can be configured to allocate uplink resources in a manner that is cognizant of the probability that the requesting subscriber station will transmit the uplink signal at a power level that may result in high order signal products exceeding an emissions constraint in an emissions band. For example, the base station 800 may determine, based on the power control metric corresponding to the requesting subscriber station, that the subscriber station will likely be operating at a transmit power that results in substantial levels of 3rd and 5th order distortion products.

The base station 800 can allocate uplink resources to the requesting subscriber station in a manner that reduces the likelihood that the distortion products will extend into an emissions band. In general, the base station 800 can be configured to allocate uplink bandwidth such that subscriber stations that are expected to transmit with higher transmit powers are located at frequencies farther from the emissions band.

The base station 800 can include a modulation subcarrier map 872 that can include, for example, memory that stores a look up table, map, database, or the like, that relates a modulation type and expected transmit power to candidate subcarrier allocations. The uplink resource controller 870 can be configured to access the modulation subcarrier map 872 to determine candidate subcarrier allocations supporting a particular uplink resource request. The uplink resource controller 870 can select a resource allocation from the candidate subcarrier allocations and can schedule the uplink resource to the requesting subscriber station.

In general, the greater the subscriber station transmit power, the farther the frequency resource allocation should be from a restricted emissions band. The base station 800 can effectively manage uplink emissions in an emissions band by selectively allocating subcarrier resources. The base station 800 can implement the emissions management techniques independently of any emissions reduction techniques supported by the subscriber station.

Figure 9A:
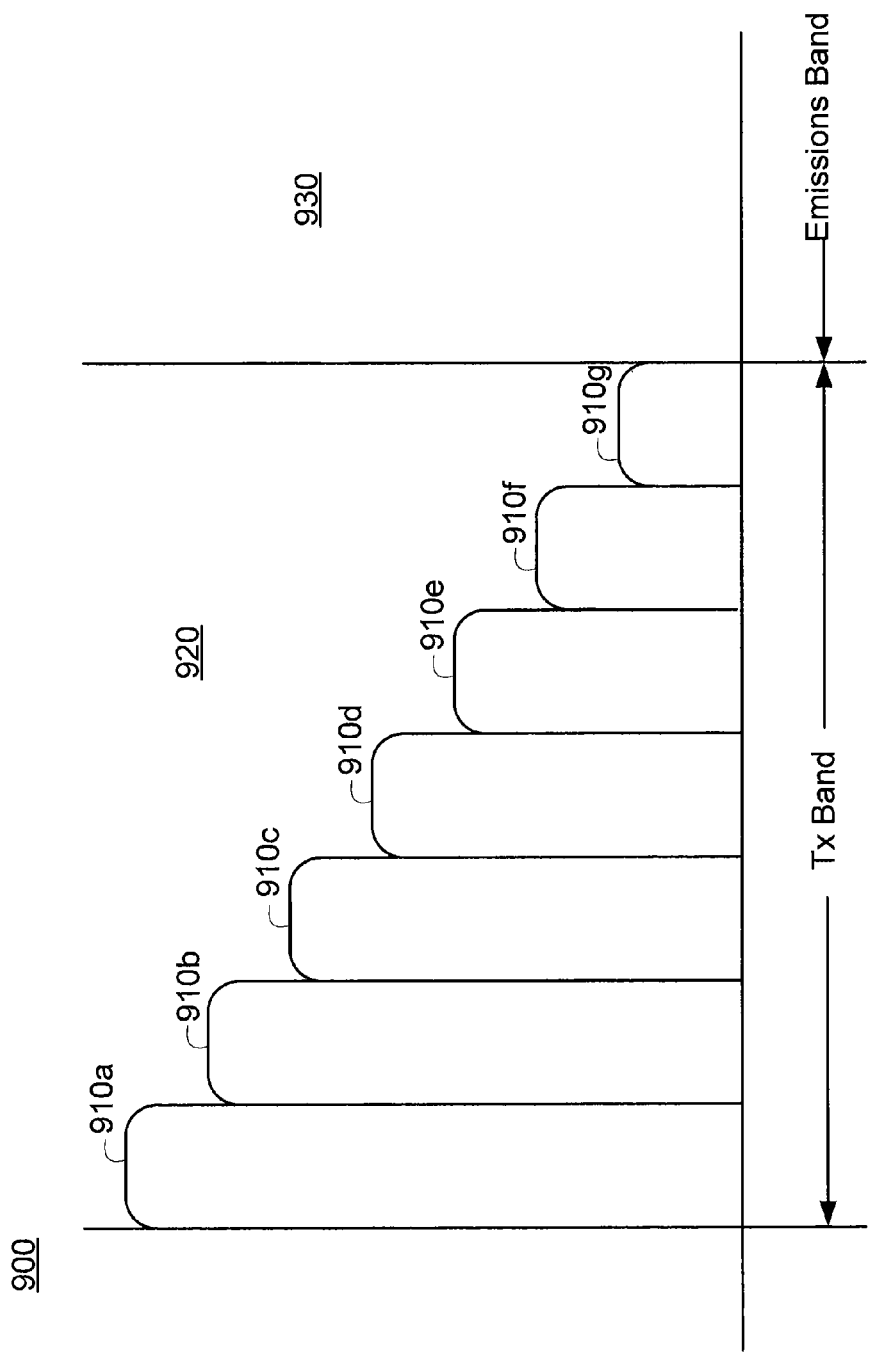
FIGS. 9A and 9B are simplified spectrum diagrams illustrating channel allocation embodiments.
Figure 9B:
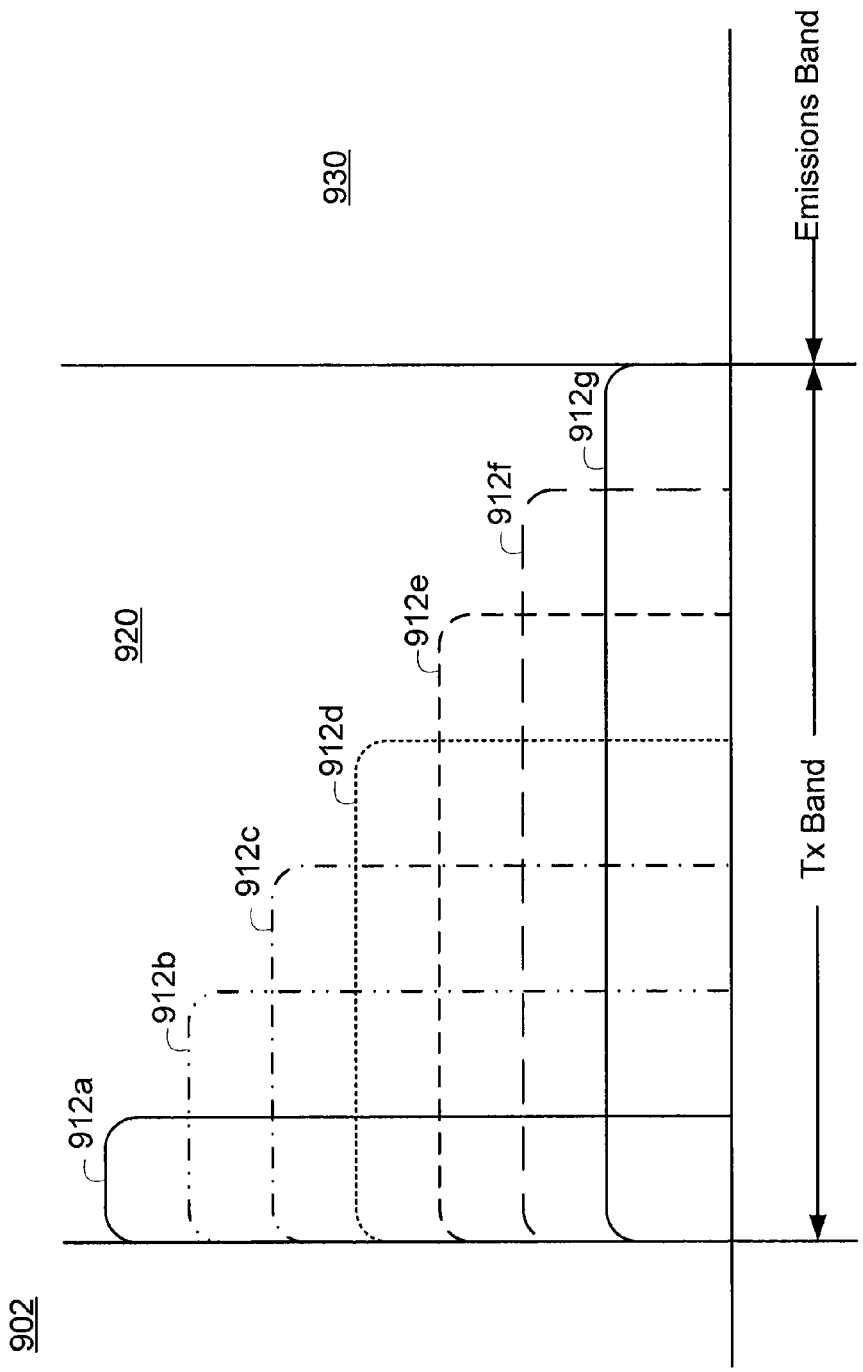

FIGS. 9A and 9B are simplified spectrum diagrams 900 and 902 illustrating channel allocation embodiments. The base station of FIG. 8 can be configured to allocate uplink channels in the manner shown in FIG. 9A or 9B.

FIG. 9A illustrates a transmit band 920 with an adjacent restricted emissions band 930. The restricted emissions band 930 is shown as positioned above (at a higher frequency relative to) the transmit band 920.

The transmit band 920 is divided into a plurality of distinct channels 910*a*-910*g*. The number of distinct channels 910*a*-910*g* is not limited to the number of channels depicted in FIG. 9A, but can be virtually any number of channels. For example, the number of distinct channels 910*a*-910*g* can correspond to the number of subchannels supported by an IEEE802.16 OFDMA system supporting AMC mode of operation.

The base station can selectively allocate resources in an AMC zone that is a temporal zone. Within the AMC zone the base station assigns the subscriber station to transmit in specific subgroups and specific times. The identity of the subgroups, bins, or subchannels can depend on the expected subscriber station uplink transmit power. Subscriber stations having lower expected uplink transmit power can be allocated subchannels closer to the restricted emissions band.

In general, an OFDMA wireless communication system can support a number of distinct channels 910*a*-910*g* up to the number of distinct subcarriers in each OFDM symbol. The base station can allocate each of the distinct channels for a predetermined period of time, such as a predetermined frame period. Alternatively, the base station can allocate the channels indefinitely or until released by the subscriber station or the base station.

The base station can include a resource allocation map or look up table that relates candidate channels with uplink transmit power. For example, subscriber stations that are expected to transmit at up to a maximum transmit power are allocated resources from a first channel 910*a*, positioned in the transmit band 920 furthest from the restricted emissions band 930. Similarly, as the expected transmit power reduces, the candidate channels move nearer the restricted emissions band 930. Thus, each of the channels 910*b*-910*g* is used to support transmit powers less than the transmit power supported by in the first channel 910*a*. Each channel 910*a*-910*g* supports a progressively lower transmit power in relation to its proximity to the restricted emissions band 930.

Each of the plurality of distinct channels 910a-910g is depicted as supporting approximately the same bandwidth. However, this is not a limitation, and the bandwidth supported by each of the channels 910a-910g may be the same as another channel or may be distinct from all other channels. Furthermore, the plurality of distinct channels 910a-910g are shown as spanning substantially the entire transmit band 920. However, the base station can be configured to support channels that span less than the entire transmit bands 920. For example, the base station may not support channels, e.g. 910f and 910g, that are positioned nearest the restricted emissions band 930. In the extreme, the base station can support a single channel, e.g. 910a that spans a portion of the transmit band 920 and may not support any other channels.

FIG. 9B illustrates a spectrum 902 for an alternative manner of resource allocation. In the spectrum diagram 902 of FIG. 9B, the available bandwidth that a base station can allocate to support an uplink resource request is limited by the expected transmit power. The number of bandwidth portions 912a-912g is not limited to the number illustrated in FIG. 9B, and the bandwidth portions are not limited to multiples of a narrowest bandwidth portion 912a.

As illustrated in the spectrum diagram 902 of FIG. 9B, the base station can allocate increasingly larger portions of the transmit band 920 to a subscriber station as the expected transmit power decreases. Additionally, each bandwidth portion 912a-912g is biased away from the emissions band. The bandwidth portion 912a having the narrowest bandwidth and supporting the largest transmit power is positioned furthest from the restricted emissions band 930. The next bandwidth portion 912b supporting the next lower transmit power begins at the same lower band edge, but extends further towards the restricted emissions band 930. Therefore, each bandwidth portion 912a-912g overlap other bandwidth portions.

The base station can determine one or more candidate bandwidth portions 912a-912g corresponding to one or more allocatable channels based on a bandwidth of the uplink resource request and an expected or probable transmit power, determined by the transmit power metric.

As described previously, the bandwidth portions 912a-912g can, in the aggregate, support the entire transmit band 920 or may support only a portion of the transit band 920. The base station may reduce or otherwise minimize the number of distinct bandwidth portions 912a-912g by reducing the quantization levels corresponding to the expected or probable transmit power.

FIG. 10A is a simplified flowchart of an embodiment of a method 1000 of channel allocation with reduced out of band uplink emissions. The method 1000 can be implemented, for example, by the base station of FIG. 8 or a base station in FIG. 1. The method 1000 is described in the context of a base station operating in a steady state condition.

The method 1000 begins at block 1010 where the base station transmits a downlink signal. The base station can support TDD operation and can transmit a downlink signal in an operating band that is shared by the downlink and the uplink. The base station can transmit the downlink signal in a predetermined downlink time portion. The downlink signal can include, for example, data and information for supporting communication links with multiple subscriber stations and can include an uplink resource map that was generated in response to previously received resource requests.

The base station transitions to a receive mode to support the uplink TDD portion. The base station proceeds to block 1020 and receives an uplink resource request from a subscriber station. The uplink resource request can include, for example, a bandwidth request as well as a timing associated with the bandwidth request. The request may also indicate whether the resource request is in support of communications that are sensitive to scheduling latency, such as voice traffic or streaming video.

The base station may receive several uplink resource requests during one receive portion. However, the base station can be configured to handle all uplink resource requests in a similar fashion.

The base station proceeds to block 1022 and receives a power control metric that can be, for example, a feedback message of the downlink RSSI observed by the requesting subscriber station. The base station may receive a feedback message of the downlink RSSI from each subscriber station requesting uplink resources. Alternatively, the base station may receive RSSI feedback messages in a manner that is not related to the uplink resource requests. For example, the base station can receive RSSI feedback messages from one or more subscriber stations periodically, according to a schedule, based on uplink resource requests, at the request of the base station, based on occurrence of a triggering event, and the like, or some combination thereof.

In one embodiment, the base station can request that a subscriber station report an RSSI feedback message after the base station receives the uplink resource request. The base station can time the request to occur near the time that the uplink resources will be allocated. The base station may, if necessary, allocate uplink resources to the subscriber station in order for the subscriber station to report the RSSI feedback message, and may allocate the uplink resources for the RSSI feedback message along with the request for the RSSI feedback message.

The base station can determine an expected uplink transmit power based on the RSSI feedback value. For example, a subscriber station reporting a relatively low RSSI value will likely transmit at a relatively large transmit power in order to support a communication link with the base station. Similarly, a subscriber station reporting a relatively strong RSSI value will likely transmit at a relatively low transmit power in order to support a communication link with the base station.

The base station proceeds to block 1030 and determines a modulation type and rate and a bandwidth that will support the uplink request. The base station will also consider the expected transmit power determined from the RSSI feedback in scheduling the modulation type and bandwidth. For example, the base station may reserve a relatively narrow bandwidth for supporting relatively high transmit power subscriber stations, and the reserved bandwidth may be insufficient to support the full bandwidth requested by the subscriber station.

After determining the modulation and bandwidth, the base station proceeds to block 1032 and determines a subcarrier allocation based, at least in part on the expected transmit power determined from the RSSI feedback. The base station can allocate subcarriers furthest from an emissions band to subscriber stations having the highest expected transmit power. The base station can implement, for example, a subcarrier allocation scheme that is consistent with the spectrum diagrams illustrated in FIGS. 9A and 9B.

After determining the subcarrier allocations, the base station proceeds to block 1040 to configure the uplink allocation message. For example, the base station can include the resource allocation in an UL-MAP message. The base station then proceeds back to block 1010 to transmit the downlink signal having the UL allocation message.

Although the uplink transmit emissions may be controlled, in part, by resource allocation controlled by the base station, the subscriber station may implement a complementary transmit emissions mask that limits its maximum transmit power based on the uplink resource allocation received from the base station. For example, the subscriber station may implement a modulation subcarrier map that is complementary to the one implemented in the base station of FIG. 8. The subscriber station modulation subcarrier map can relate a modulation type and bandwidth allocation to a maximum transmit power. Thus, the subscriber station may implement the maximum transmit power limitations illustrated in the spectrum diagrams of FIGS. 9A and 9B based on the uplink resource allocations. The subscriber station can base the maximum transmit power in part on the modulation type in order to satisfy error vector magnitude requirements. Additionally, the subscriber station can limit the maximum transmit power based in part on its proximity to a restricted emissions band, in order to satisfy emissions constraints and to minimize emissions that may interfere with other devices.

In an extreme example of subscriber station power management, the base station can allocate a modulation type and bandwidth for subscriber station uplink transmissions. The base station may permit the subscriber station to manage emissions by commanding the subscriber station to transmit at an extreme transmit power, such as at the maximum transmit power. The subscriber station can utilize a modulation subcarrier map to determine the actual maximum allowable transmit power, based on the uplink resource allocation.

The subscriber station may have the ability to generate a revised or dynamic modulation subcarrier map when the subscriber station also implements LO hopping, bandwidth reduction, subcarrier remapping, or some combination thereof. The subscriber station implementing hopping and squishing of the uplink signal may have the ability to transmit at a higher transmit power relative to a subscriber station not implementing any LO offset or bandwidth reduction.

The subscriber station can implement the transmit power constraints in place of, or in addition to, any of the emissions reduction techniques previously discussed. Implementing the transmit power constraints within the subscriber station allows the base station to operate with substantially no regard to the manner in which the subscriber station limits its out of band emissions.

FIG. 10B is a flowchart of an embodiment of a method 1002 of transmit power constraints related to uplink resource allocation. The method 1002 can be implemented, for example, in a subscriber station of FIG. 3 or in one or more of the subscriber stations of FIG. 1. The subscriber station implemented method 1002 can be viewed as complementary to the method 1000 illustrated in FIG. 10A that is implemented in a base station.

The method 1002 begins at block 1050 where the subscriber station receives a downlink transmission from a base station. The subscriber station can receive a downlink transmission regardless of whether any information within the downlink transmission is directed to the subscriber station.

The subscriber station proceeds to block 1052 and determines a power metric based on the received signal. For example, the subscriber station can determine a RSSI value of the received downlink signal. The base station can be configured to transmit a relatively constant power or power density, and the RSSI value can indicate a relative link quality or link loss.

Although the method 1002 illustrates determining an RSSI value following each downlink transmission, the subscriber station need not determine an RSSI value following each downlink transmission, but may determine the RSSI value according to a schedule, timing algorithm, predetermined period, triggering event, base station request, and the like, or some combination thereof.

The subscriber station proceeds to block 1060 and requests a resource allocation if it has information to transmit in an uplink portion. Of course, this step may be omitted if the subscriber station has no need for uplink resources. The subscriber station proceeds to block 1062 and reports the power metric in a feedback message to the base station. The feedback message can be the power metric, such as the RSSI value, or can be some metric derived or otherwise indicative of the power metric. The subscriber station can generate the feedback message, for example, in response to a request, periodically, or in response to a triggering event.

The subscriber station proceeds to block 1070 and receives an uplink resource allocation in response to the request. The uplink resource allocation may include a modulation type, bandwidth, subcarrier assignment, and associated time.

The subscriber station proceeds to block 1072 and determines maximum transmit power constraints based in part on the resource allocation. For example, the subscriber station can implement a modulation subcarrier map in a look up table that relates a maximum transmit power to a modulation type and subcarrier and bandwidth allocation. The modulation subcarrier map can implement a transmit power constraint that results in the spectrum diagram of FIG. 9A or 9B.

The subscriber station proceeds to block 1080 and utilizes the resource allocation while observing the transmit power constraint determined based on the resource allocation. The subscriber station can then return to block 1050 for the next downlink portion.

Methods and apparatus for reducing emissions in a transmitted signal are described herein. The transmit emissions, and in particular the out of band emissions, can be reduced through reducing the transmit bandwidth, reducing the corresponding filter bandwidths, LO offset, transmit signal remapping, or some combination thereof. The emissions reduction techniques can be implemented within a transceiver of a subscriber station without any knowledge of the emission reduction techniques by a corresponding base station.

As used herein, the term coupled or connected is used to mean an indirect coupling as well as a direct coupling or connection. Where two or more blocks, modules, devices, or apparatus are coupled, there may be one or more intervening blocks between the two coupled blocks.

The steps of a method, process, or algorithm described in connection with the embodiments disclosed herein may be embodied directly in hardware, in a software module executed by a processor, or in a combination of the two. The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes.

The above description of the disclosed embodiments is provided to enable any person of ordinary skill in the art to make or use the disclosure. Various modifications to these embodiments will be readily apparent to those of ordinary skill in the art, and the generic principles defined herein may be applied to other embodiments without departing from the scope of the disclosure.

What is claimed is:

1. A method of reducing out of band emissions, performed by a base station, the method comprising:
   transmitting a downlink transmission;
   receiving from a subscriber station a request for uplink transmission resources;
   receiving, from the subscriber station, a feedback message including a power control metric based on the downlink transmission;
   determining an expected power level at which the subscriber station is expected to transmit in an uplink transmission responsive to the power control metric received from the subscriber station;
   determining a position of a portion of an available bandwidth for uplink transmissions based on the determined expected power level and based on a probability that the subscriber station transmitting at the expected power level will result in distortion products exceeding an emissions constraint associated with an emissions band; and
   allocating to the subscriber station the portion of the available bandwidth for uplink transmissions, responsive to the request for uplink transmission resources and the determined expected power level.

2. The method of claim 1, further comprising:
   configuring an uplink allocation message including an indication of uplink transmission resources that have been allocated to the subscriber station; and
   transmitting the uplink allocation message to the subscriber station.

3. The method of claim 2, wherein the configuring the uplink allocation message comprises configuring an uplink map (UL-MAP) message.

4. The method of claim 1, wherein the feedback message is a Received Signal Strength Indication (RSSI) feedback message.

5. The method of claim 1, wherein the allocating the uplink transmission resources comprises:
   determining a modulation type and a signal bandwidth responsive to the request for uplink transmission resources; and
   allocating at least one Orthogonal Frequency Division Multiplex (OFDM) symbol subcarrier to the subscriber station responsive to the modulation type and the signal bandwidth.

6. The method of claim 1, wherein the base station allocating the uplink transmission resources to the subscriber station further comprises:
   the base station allocating the uplink transmission resources such that a location of the portion of the available bandwidth that is allocated to the subscriber station with respect to an emissions band depends on the expected power level at which the subscriber station is expected to transmit in the uplink.

7. The method of claim 1, wherein the determining the position of the portion of the available bandwidth further comprises positioning the portion of the available bandwidth at frequencies further away from the emissions band for uplink transmissions for a subscriber station having a higher expected power level.

8. A method of reducing out of band emissions performed by a subscriber station, the method comprising:
   receiving a downlink transmission from a base station;
   determining a power control metric responsive to the downlink transmission received from the base station;
   transmitting a request for uplink transmission resources from the base station;
   transmitting a feedback message including the determined power control metric to the base station, the power control metric being useable by the base station to determine an expected power level at which the subscriber station is expected to transmit;
   receiving an allocation of a portion of an available bandwidth for the uplink transmission resources from the base station, the portion of the available bandwidth allocated for uplink transmissions received from the base station being responsive to the request for uplink transmission resources and the determined expected power level,
   the allocated portion of the available bandwidth for uplink transmission being positioned away from at least one band of interest to reduce out-of-band emissions therein; and
   determining a transmit power constraint responsive to the allocation of the portion of the available bandwidth for the uplink transmission resources received from the base station, the transmit power constraint being based on a position of the allocated portion of the available bandwidth.

9. The method of claim 8, wherein receiving the downlink transmission comprises receiving at least one Orthogonal Frequency Division Multiplex (OFDM) symbol during a downlink Time Division Duplex (TDD) portion.

10. The method of claim 8, wherein receiving the downlink transmission comprises receiving at least one Orthogonal Frequency Division Multiplex (OFDM) symbol having a fixed power density over a bandwidth of the OFDM symbol.

11. The method of claim 8, wherein receiving the resource allocation comprises receiving at least one of a modulation type and a bandwidth allocation.

12. The method of claim 8, wherein receiving the allocation of the uplink transmission resources comprises receiving an uplink map (UL-MAP) message including the allocation of the uplink transmission resources.

13. The method of claim 11, wherein determining the transmit power constraint comprises:
   determining a maximum transmit power responsive to at least one of the bandwidth allocation and the modulation type; and
   transmitting an uplink transmission using the at least one of the bandwidth allocation and the modulation type and limiting a power of the uplink transmission to the maximum transmit power.

14. A base station comprising:
   a transmitter configured to transmit a downlink transmission;
   a receiver configured to receive a request for uplink transmission resources from a subscriber station, and to receive a feedback message comprising a power control metric from the subscriber station based on the downlink transmission; and
   an uplink resource controller configured to:
      determine an expected power level responsive to the power control metric received from the subscriber station at which the subscriber station is expected to transmit to the base station;
      determine a position of a portion of an available bandwidth for uplink transmissions based on the determined expected power level and on a probability that the subscriber station transmitting at the expected power level will result in distortion products exceeding an emissions constraint associated with an emissions band;

allocate the portion of the available bandwidth for uplink transmissions to the subscriber station responsive to the request for uplink transmission resources and the determined expected power level; and generate an uplink resource message including an indication of uplink transmission resources that have been allocated to the subscriber station;

the transmitter further configured to transmit the uplink resource message to the subscriber station.

15. The base station of claim 14, further comprising:

a modulation subcarrier map configured to store a look up table that relates the power control metric to an uplink bandwidth portion, wherein the uplink resource controller is further configured to allocate the uplink transmission resources in accordance with the look up table.

16. The base station of claim 15, wherein the look up table further relates a combination of an expected transmit power and a modulation type to the uplink bandwidth portion and the expected transmit power is responsive to the power control metric.

17. The base station of claim 14, wherein the uplink resource controller is further configured to allocate the uplink transmission resources such that a location of the portion of the available bandwidth that has been allocated to the subscriber station with respect to an emissions band depends on the expected power level at which the subscriber station is expected to transmit in the uplink.

18. A subscriber station comprising:

a receiver configured to receive a downlink transmission and an allocation of a portion of an available bandwidth for uplink transmission resources from a base station;

a power detector configured to determine a power control metric based on the received downlink transmission; and a transmitter configured to transmit to the base station a request for the uplink transmission resources and a feedback message containing the power metric, wherein:

the power control metric is usable by the base station to determine a power level at which the subscriber station is expected to transmit in the uplink;

the portion of the available bandwidth allocated for uplink transmissions received from the base station is responsive to the request for uplink transmission resources and the determined expected power level, and is positioned away from at least one band of interest to reduce out-of-band emissions therein; and the transmitter is constrained to a maximum transmit power responsive to the allocation of the portion of the available bandwidth, the maximum transmit power being based on a position of the portion of the available bandwidth allocated for uplink transmissions.

19. The subscriber station of claim 18, further comprising:

a modulation subcarrier map configured to store a look up table that relates the maximum transmit power to a modulation type and an uplink allocation, wherein the transmitter is further configured to determine the maximum transmit power in accordance with the look up table.

* * * * *